(12) United States Patent
Bentley et al.

(10) Patent No.: US 6,341,291 B1
(45) Date of Patent: Jan. 22, 2002

(54) SYSTEM FOR COLLABORATIVE ENGINEERING USING COMPONENT AND FILE-ORIENTED TOOLS

(75) Inventors: Keith A. Bentley, Elverson, PA (US); Samuel W. Wilson, Wilmington, DE (US); Barry J. Bentley; Raymond B. Bentley, both of Elverson, PA (US); John B. Gooding, Spring City, PA (US)

(73) Assignee: Bentley Systems, Inc., Exton, PA (US)

( * ) Notice: Subject to any disclaimer, the term of this patent is extended or adjusted under 35 U.S.C. 154(b) by 0 days.

(21) Appl. No.: 09/296,738

(22) Filed: Apr. 22, 1999

Related U.S. Application Data

(60) Provisional application No. 60/102,118, filed on Sep. 28, 1998.

(51) Int. Cl.[7] .............................................. G06F 17/30
(52) U.S. Cl. ........................................ 707/203; 703/4
(58) Field of Search ................................. 707/12, 9–10, 707/202–203; 703/4

(56) References Cited

U.S. PATENT DOCUMENTS

| | | | |
|---|---|---|---|
| 5,437,027 A | 7/1995 | Bannon et al. | 707/103 |
| 5,546,595 A | 8/1996 | Norman et al. | 710/10 |
| 5,815,415 A | * 9/1998 | Bentley et al. | 702/4 |
| 5,911,074 A | 6/1999 | Leprince et al. | 717/3 |

* cited by examiner

Primary Examiner—Hosain T. Alam
Assistant Examiner—Jean Bolte Fleurantin
(74) Attorney, Agent, or Firm—Venable; James R. Burdett

(57) ABSTRACT

Conventional file-based engineering design data for an engineering model are represented by a plurality of components. Each component has a unique identifier, a set of fields, each field having a data type and a data value, and a program which interprets and modifies the fields. The plurality of components are stored in a repository of a server. The repository also stores a history of any changes made to the components. A plurality of client computers are bidirectionally connected to the server. Each client computer may obtain the current version of the components and may send locally edited versions of the components back to the server to replace the current versions in the repository. At the client computer, the user interacts with the components using conventional file-based software. Before locally edited versions of the components are committed to the server to replace the current versions, a synchronization and merging process occurs whereby the latest version of the components are downloaded to the client computer and are compared to the locally edited version of the components to detect resolvable (compatible) and unresolvable (incompatible) conflicts therebetween. The commit process is performed only if no unresolvable conflicts exist between the two versions of the components. To facilitate translation between file-based data and components, a schema is written to "wrap" each of the engineering file formats. Each schema is a set of classes that capture all of the information in the file-based data.

12 Claims, 19 Drawing Sheets

```
          PROJECT REGISTRY FILE
7
   project
      name=terminal12
      type=socket
      server=rasputin
      port=3334
      serverStore=d:\projectbank\terminal12\terminal12
      serverShadowDirectory=d:\projectbanks\terminal12\shadow
      description=Terminal 12 renovation
      clientShadowDirectory=\\rasputin\pbshare\terminal12\shadow project
      name=route222
      server=ddserver
      port=3341
```

```
struct line_2d                                                    ⌐90
    {
    Elm_hdr        ehdr;           /* element header */
    Disp_hdr       dhdr;           /* display header */
    Point2d        start;          /* starting point */
    Point2d        end;            /* ending point */
    } Line_2d;
```

```
public jmdl_schema                                                ⌐91
class          Line2d
extends        AbstractPlanarLineString
implements     IDgnElement.IDgnDisplayable
{
    DgnDisplayableHeader    m_header;
    unsigned int            m_sequenceNumber;  ⌐94
    DPoint2d                m_points{2};
}
```

```
public jmdl_schema                                                ⌐92
struct DgnDisplayableHeader
{
    unsigned short    m_elmHdrBitFields;   // level, complex, type, deleted
    unsigned short    m_grphgrp;           // graphics group number
    unsigned short    m_props;
    unsigned short    m_symb;
    unsigned short    m_flags;
    unsigned int      m_zLow;
    unsigned int      m_zHigh;
    unsigned int      m_assocTag;  ⌐93
    T_LinkageData     m_linkageData;
}
```

FIG. 23

SYSTEM FOR COLLABORATIVE ENGINEERING USING COMPONENT AND FILE-ORIENTED TOOLS

CROSS-REFERENCE TO RELATED APPLICATIONS

This application claims the benefit of U.S. Provisional Application No. 60/102,118 filed Sep. 28, 1998 pending entitled "PROJECTBANK—A TECHNOLOGY FOR ENABLING COLLABORATIVE ENGINEERING WITH COMPONENT AND FILE-ORIENTED TOOLS"

BACKGROUND OF THE INVENTION

The present invention relates to a system for storing, managing and tracking changes to design information typically created in multi-user, multi-discipline, engineering projects. Specifically, the present invention provides a management tool for tracking and managing multiple simultaneous changes to a project data set in a cohesive, secure, identifiable, and reversible way. Importantly, the invention provides interfaces for importing data from, and for making changes to, the project data set with file-oriented tools such as CAD programs.

The goal of concurrent engineering is to enable multiple users to work on the same design concurrently, each contributing his own expertise in a way that builds on and complements the work of others. Engineering projects present a particularly challenging Computer Information Management problem since they are characterized by workflows that involve multiple participants simultaneously making changes to related information. Current generation software products, particularly those in the category known as "CAD" (Computer Aided Drafting), are weak at supporting these workflows, since they were generally designed to replicate and automate the one-at-a-time nature of drafting boards. In pre-CAD workflows, a paper drawing could only be modified by a single draftsperson at a time. Thus, it seemed natural that the computerized equivalents would take the same approach. However, that approach is now seen as inadequate. First, the manual process on which the software design is based has limitations and problems. For example, coordination between draftspeople required verbal communication between the draftspeople which is subject to a breakdown. Second, the 'ubiquitous' nature of electronic information access tends to exacerbate the weaknesses of the manual communications process. "Electronic participants" on a project can now be physically dispersed as a byproduct of the 'virtual office' model made possible by communications advances such as the Internet. Third, software advances are making electronic engineering simulations more powerful and reliable such that the computer model can be regarded as the master design information, with design drawings representing reports generated from that model.

Accordingly, the software model of storing engineering projects as a disconnected series of "drawing files" must be updated to advance the state-of-the-art. The present invention fulfills such a need.

BRIEF SUMMARY OF THE PRESENT INVENTION

One embodiment of the present invention provides a method of managing filed-based data which is manipulated by at least one user via a file-based computerized editor. The file-based data includes a plurality of file elements. The file-based data are represented as a plurality of individual components wherein each individual component has a unique identity and identifier. The individual components are stored in a repository. Each component has a unique identifier, a set of fields, each field having a data type and a data value, a program which interprets and modifies the fields, and, optionally, a list of other dependent components. A schema is defined for the plurality of components. The schema is a set of classes that capture all of the information in the filed-based data. The schema is retrieved whenever the components are retrieved from the repository.

The present invention also provides a data management structure for engineering design data comprising a plurality of components. Each component has a unique identifier, a set of fields, each field having a data type and a data value, and a program which interprets and modifies the fields, and, optionally, a list of other dependent components. At least some of the components represent respective elements in a filed-based computerized editing system.

The present invention further provides a repository for storing a plurality of engineering models. Each engineering model comprises engineering design data and includes a specific plurality of components. Each component has a unique identifier, a set of fields, each field having a data type and a data value, a program which interprets and modifies the fields, and, optionally, a list of other dependent components. At least some of the components represent respective elements in a file-based computerized editing system.

The present invention further provides a scheme for translating file-based data, which is manipulated by at least one user via a file-based computerized editor, into a plurality of individual components. The file-based data includes a plurality of file elements. In the scheme, file-based data is represented as a plurality of individual components having the attributes discussed above. A memory stores the individual components in a repository. The present invention also provides a reverse scheme for translating a plurality of components into file-based data.

The present invention further provides a scheme for synchronizing changes to a plurality of components stored in a central repository. The repository is accessible to plural users, each of whom are permitted to revise the components in the repository. The components represent file-based data of an engineering design file. In the scheme, a user creates a temporary design file at a local computer workstation by downloading the current data in the repository and converting the current data to create an original current version of the design file at the workstation. The user then creates an edited version of the temporary design file from the original current version. Next, the user requests that the set of components which represent the edited version of the temporary design file be updated to reflect any component changes made in the repository since the creation of the original current version of the temporary design file by other users during the user's editing time period. As part of the updating process, resolvable and unresolvable component conflicts are locally detected on a per component basis between the components which represent the edited temporary version of the design file and the latest current version of the components. The components represented by the locally updated and edited temporary version of the design file are allowed to replace the latest current version of the components in the repository only if no unresolved component conflicts exist between the two versions.

The present invention farther provides a client-server system for multi-user management of engineering data. The system comprises a server and a plurality of client computers. The server includes a repository for storing a current version of a plurality of components. The components represent elements of at least one engineering project. Each component has the attributes discussed above. Each client computer is bidirectionally connected to the server for receiving the current version of a plurality of components representing elements of an engineering project, and for sending locally edited versions of the components back to the server. Each client computer includes a component memory for storing a local version of the components. The components in the component memory of each client computer may be locally edited in successive editing sessions. To facilitate this process, the component memory stores the latest version of the plurality of individual components, and information to fully document changes made to each version of each individual component during the local editing. Each client computer interacts with the server to perform component synchronization and commit processes as discussed above.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIG. 23 shows an example of the software code used for DGN schema element mapping;

DETAILED DESCRIPTION OF THE INVENTION

Figure 1:
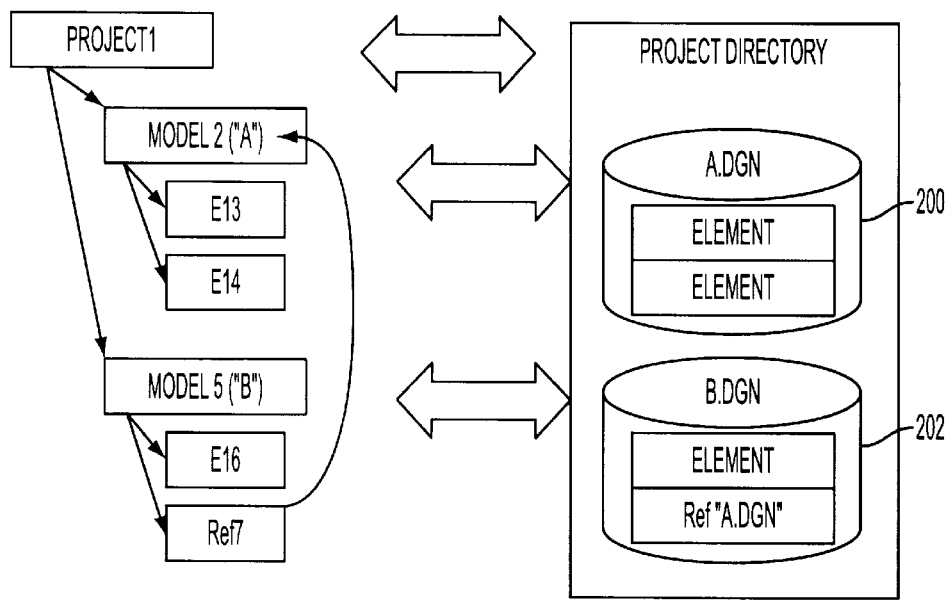
FIG. 1 shows a logical view of how design files relate to the ProjectBank component model in accordance with the present invention.

Certain terminology is used herein for convenience only and is not to be taken as a limitation on the present invention. In the drawings, the same reference letters are employed for designating the same elements throughout the several figures.

The present invention subdivides Engineering Project Information into smaller units than drawings so that a more granular unit-of-interchange is presented to project participants. These smaller units are called "components," which are comprised of data values, data types, programs that manage the data, and connections to other components. The technology is named "ProjectBank™" (hereafter, "ProjectBank") and is referred to by that name throughout the specification. The component granularity of ProjectBank more accurately reflects the reality of the "interconnectedness" of design workflows compared to conventional file-based systems. Importantly, ProjectBank defines a transaction-based approach to allowing modifications to components that facilitates truly collaborative workflows, even by disjoint project teams. Conventional file-based systems lack such a capability.

Of course, investment in current technologies is very high and substantial changes to them will be expensive and slowly adopted. Any new software approach must be considered in the context of today's systems and upward compatibility is a paramount concern. The present invention combines the ProjectBank technology with file-oriented engineering software programs (such as CAD programs) and their corresponding data-files, without modifing the programs. This approach greatly increases the level of collaboration possible with existing tools without requiring substantial changes to existing workflows.

A. DEFINITIONS

COMPONENT—smallest unit of interchange in the system. A single component has a set of data values associated with it. If these values were all that defined a component, it would be commonly referred to in the literature as an "object." However, components differ from objects in that components also have a set of names and data types that define each data value (collectively, a "field"), a program that can interpret and modify the fields (a "class"), and, optionally, a list of other "dependent components." The definition of a component includes each of these concepts, and they must be considered inseparable from one another such that it must never be possible to encounter one without the others (although it is obvious that components of the same type can share a class).

The concept of a "component" was first introduced in U.S. Pat. No. 5,815,415 (Bentley et al.) which is incorporated by reference herein. However, this patent had no discussion of how components may be used for collaborative engineering.

SCHEMA—a collection of related classes that address a particular problem space.

JMDL—a programming language for creating schemas.

COMPONENT DATABANK (CDB)—a multi-user repository for components. Components each have an identity that is guaranteed to be unique with respect to all other components in the same Databank. To satisfy the definition of a component above, a Component Databank must store not only the data values of components, but also the schemas and dependent lists for each component. Information contained in an engineering project is captured in a CDB. This CDB is called the ProjectBank for a particular project. The CDB may alternatively be referred to as the "component memory" or "component memory bank."

DESIGN FILE—a predefined data file created and edited by file-oriented CAD tools such as MicroStation® (hereafter, "MicroStation") and AutoCAD® (hereafter, "AutoCAD"). A MicroStation Design File is frequently referred to as a DGN file, and an AutoCAD Design File is frequently referred to as a DWG file.

FULLY DOCUMENT—This refers to the process of storing sufficient information about changes made to a component over time so that any of the previous states of the component (e.g., state n-1, n-2, . . . ) may be recreated. The documentation process may store snapshots of the actual component in each state, or the process may store delta values or difference descriptions.

BRIEFCASE—a file in a user or client computer which stores a local copy of a subset of the components in the CDB for a particular project. Briefcases are discussed in more detail below.

B. OVERVIEW OF THE PRESENT INVENTION

A project is composed of models, and models are composed of elements. Models divide a project into logical areas. Models may overlap in that they express different aspects of the project that occupy the same space, or they may express different views of the same aspects. Engineers commonly view many models together at the same time, in order to perceive the fullness of the project definition.

Normally, a team of engineers and supporting technicians will collaborate on a project. The purpose of collaboration is to enable each member of the team to contribute to a combined result Controlling the process of sharing information between cooperating team members and combining changes from them into a coherent result is the challenge of a collaborative engineering technology.

Members of a design team may use a variety of tools to view and edit project information. This toolset may change during the lifetime of the project. The tools in use at any one time may not be filly interoperable on their own, as each takes a particular view of the project information, according to its intended purpose. Integrating tools is a challenge of project technology, and it becomes a major challenge in long-lived, collaborative projects. Since these tools must be taken as a "given" from the perspective of ProjectBank (i.e., it is impractical to propose rewriting them to become and then remain aware of one another), a level-of-indirection is required between these tools and the master copy of the design information stored by ProjectBank.

LIMITATIONS OF THE FILE-ORIENTED APPROACH TO DESIGN DATA MANAGEMENT

To simplify the data management task, most engineering design tools store each model in its own physical file. The main drawback of this approach, in a multi-user setting, is that it imposes a fixed limit on how users can collaborate on a project. By mapping the design concept of a model to the operating system concept of a file, these tools impose file system concepts and limitations on the structure and flow of design work. This is a bad fit in several respects.

File-oriented tools commonly do file-level locking, which permits only one user to modify anything pertaining to a given model at a given time. In engineering design work, a change to an existing design or the further development of a design can commonly take several days and involve a number of smaller steps. In some cases, changes may affect large parts of the project. A single engineer may therefore keep a given set of design files locked and out of circulation for long periods of time, blocking the progress of other users whose changes may require write access to one or more of those files. Clearly, the coarse-grained, file-oriented approach becomes a bottleneck to team work. Equally clearly, even if the unit of information sharing and change-control could be broken down, it would be inappropriate to apply traditional multi-user transaction concurrency rules, which assume relatively quick, isolated changes.

The file-oriented approach also does not address the problem of how to merge the collaborative work of many users on many files into a coherent change to the project. By limiting concurrency, the file-oriented approach does simplify the problem somewhat (assuming that file-sharing is used correctly to prevent collisions and loss of work in the first place). However, when change is limited to one-at-a-time access to files, there is no chance to express and maintain the interdependencies that exist between files, since it could potentially require that all files be locked in order to make a change to any one. Therefore, the file-oriented approach is to permit these inconsistencies, and require manual inspection by a "higher-power" (usually an individual responsible for "project management") to rectify them. In most cases, merging is done "by eye" during sign-off. It would be beneficial if "business logic" that enforces standards and design constraints could be integrated into the editing process. The need for automatic methods of verification becomes greater as concurrency is increased.

The merge problem is one aspect of the general problem of documenting, managing, limiting, and potentially reversing the evolution of a design, which is made more complicated when multiple designers are working on it at the same time. Another aspect of this problem is keeping an infallible log of changes, so that they can be subsequently reviewed when questions arise. If the unit of change is per-file, then change documentation is harder to do in a sufficiently detailed fashion, and harder to integrate into the editing process itself to guarantee an accurate and useful audit trail. Add-on products such as "work-flow" managers and PDMs do not address this problem of granularity.

Despite these limitations, traditional file-oriented programs such as MicroStation are very efficient viewing and editing tools and are well known by many users, so there is strong incentive to continue to use them.

INTEROPERABILITY OF HETEROGENOUS TOOLS

A single engineering design team will sometimes use different design tools, each operating on its own design format, in a single project. Or, one engineer may receive a design in one format but need to use an editing tool that reads a different format in order to review or change it. The so-called "file-conversion" problem requires that engineering data modeled in the format of one tool be converted to the format of a different tool. Since different tools and formats have unique features, this conversion cannot always be exact, and a "round trip" will sometimes alter the design in subtle, unintended ways. The translation mismatch between heterogeneous tools has long been a substantial limitation to integration between design groups within large enterprises and between separate ones.

ProjectBank provides a solution to the heterogeneous format problem by providing a meta-data modeling environment that adds a level-of-indirection between the data files created by these design tools and the master copy of that data in the Projectbank. This level-of-indirection is provided by the JMDL programming language and the associated runtime system. It requires that JMDL be used to create schemas that describe the information created by every tool used in a project. These schemas must always be present whenever any component defined by them is involved in transaction. Therefore, ProjectBank incorporates the component definition and execution environment described in U.S. Pat. No. 5,815,415.

Since, at the component level, all information in a ProjectBank is equivalent, it becomes possible to create cross-format dependencies. That is, it is possible to create a reference from a component defined in one schema to a component from a different schema.

EXISTING SOLUTIONS

Various products have been developed to transcend the file-oriented model, while still allowing traditional tools to be applied at the viewing and editing stage. One common approach, taken for example by ModelServer Continuum™, is to store all elements of all models together in a single relational database and to produce temporary design files from the database in order to conduct a viewing or editing session. In addition to providing for better management of shared information, this approach has the benefit of making engineering data more accessible to enterprise applications. The main drawbacks to this approach are that (a) it requires mapping engineering design data into DBMS constructs, which is not always easy, (b) it requires a separate database management product to be purchased, installed, and administered, and (c) extraction is done once and for all at the start of the session (i.e., everything for the session must be extracted "up-front"). Some of these products, such as Continuum™, do address the need for a new concurrency model, but are limited by the capabilities of the underlying database management system.

The problem of mapping engineering data into a database format is severe, since the data models of engineering and DBMS tools were developed independently with different goals. It would be a major benefit to avoid the translation problem without losing the interoperability benefits of this approach.

Heretofore, no product known to the inventors uses a component-oriented approach to enable more effective collaborative use of traditional file-oriented engineering design tools.

PROJECTBANK OVERVIEW

ProjectBank allows a team of engineers to collaborate on a project, using familiar editing tools but with fewer restrictions than was previously possible. ProjectBank allows designers to use file-oriented tools while also allowing concurrency at the component level. ProjectBank also creates a context in which existing file-oriented tools become forward compatible with new tools that may be developed. And, ProjectBank achieves these improvements without requiring engineering data to be mapped into a foreign database format.

PROJECTBANK AND WRAPPING SCHEMES

The ProjectBank becomes the permanent repository for project information. The design files are temporary, as explained below. Special intermediary software reads and writes the information in the ProjectBank under long-transaction control in behalf of file-oriented editing tools.

To enable ProjectBank control of a project, a schema is written to "wrap" each of the engineering file formats used by the existing tools. Wrapping a file format means defining a set of classes that capture exactly the information that can be stored in such a file, so that the contents of any file using that format can be represented as a collection of components in the wrapping schema For example, a DGN schema would be written to wrap DGN files, defining a class for each element type, various classes to capture non-graphical and setting data, and a class to define a "DON Model."

Representing element-level information in the form of persistent components is the basis for element-level information sharing. There is no necessity for a one-to-one mapping between elements and components, although a one-to-one mapping will be common. In a file-oriented system, only a file has an identity, so only a file can be moved, changed, or archived. In a ProjectBank, each component in a bank has an identity. It is therefore possible to retrieve, update, and document changes to project information at the component/element level in ProjectBank. Since the schema exactly captures the information in a design file, an equivalent file can always be obtained from its components. This is what enables the use of traditional file-oriented tools as project data editors. (The return trip is discussed below.)

FIG. 1 shows a logical view of how design files relate to the ProjectBank component model. For example, assume there are two models, "A" and "B," respectively labeled as 200 and 202.

ProjectBank also adds and maintains additional project-, model-, and element-level information, beyond what could be represented in a design file of any format, plus historical data. Also, a wrapping schema may be extended to support capabilities such as change-merging and verification that go beyond what is required just to capture the file format. Embedding design file information in a richer information universe is the basis for how ProjectBank supports better documentation of design changes, validation, merging, and forward-compatibility with new tools. This is discussed further below.

BOOTSTRAPPING A PROJECT

When an existing engineering project is first put into a ProjectBank, its design files are imported into the ProjectBank. The ProjectBank uses the wrapping schema to create an exact component-oriented representation of each file as a model in the project. The ProjectBank becomes the master version of this information and the preexisting files will not be used directly again, but equivalent files may be recreated at any time.

TRANSACTIONS—SYNCHRONIZATION AND COMMIT

Before an editing session with a file-oriented tool is initiated, an engineer connects to a ProjectBank and requests that it re-create the current version of a design file. That design file is not merely a stand-alone unit, but is tied back to the ProjectBank from which it was produced, and its contents are tied back to the components in the ProjectBank that capture the model's information persistently. This is how ProjectBank supports round tripping. The context in which a design file exists as a window on a ProjectBank is called a "transaction" against the ProjectBank. This is explained below.

An engineer uses the appropriate file-oriented tools to edit and/or view the files created in a transaction. If two or more users are editing and/or viewing the project, then each gets his own generated copies of the design files to work on, each derived from a common source bank and tied back to it.

Figure 2:
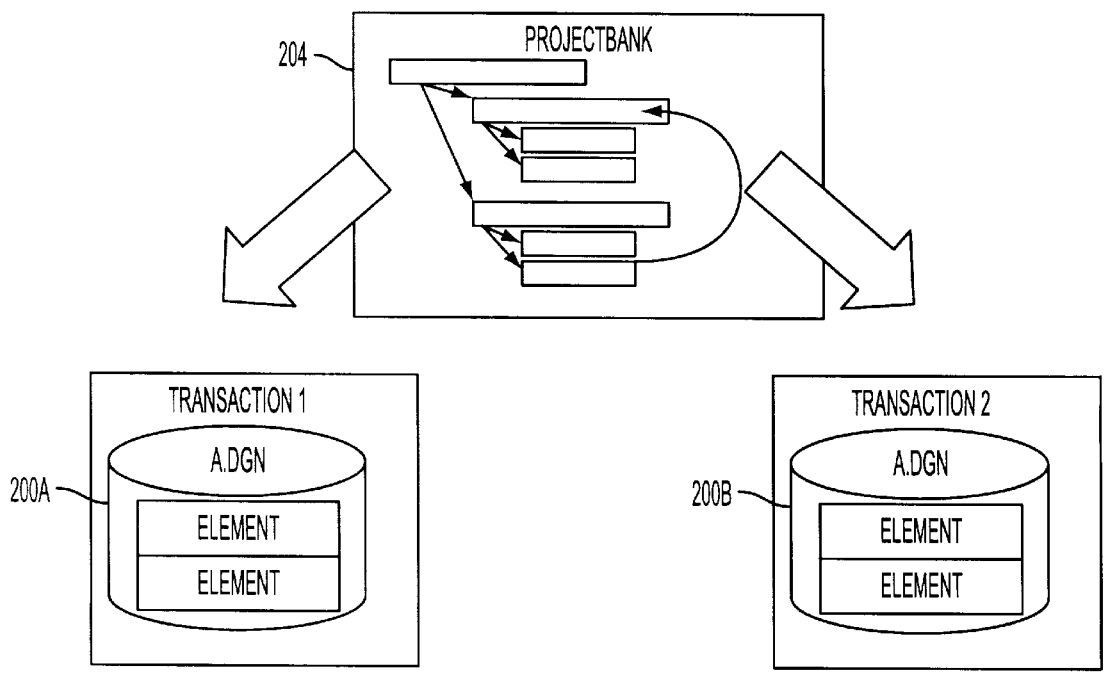
FIGS. 2 and 3 show examples of how two different users may edit elements of the same model.

FIG. 2 shows an abstract view of what would happen if two users wished to edit model "A" obtained from Project-Bank 204. (This view is "abstract" in that it ignores the fact that each user would, in fact, have a local copy of the components on his computer. That level of detail is explained later, but for simplicity is omitted here.) Each user would start his own transaction and extract his own copy of the model in design file form, respectively labeled as $200_A$ and $200_B$. (To help focus attention on the scenario, Model "B" has been de-emphasized in the diagram. Nothing has actually been done to Model B, and it could be accessed as well.)

When an editing session is over, the user has the option of posting his changes to the ProjectBank on the server. Until he does that, his changes are reflected only on his local computer. The ability to keep changes local until they are ready is a key feature of the long transaction model and is especially suited for engineering design work.

Figure 3:
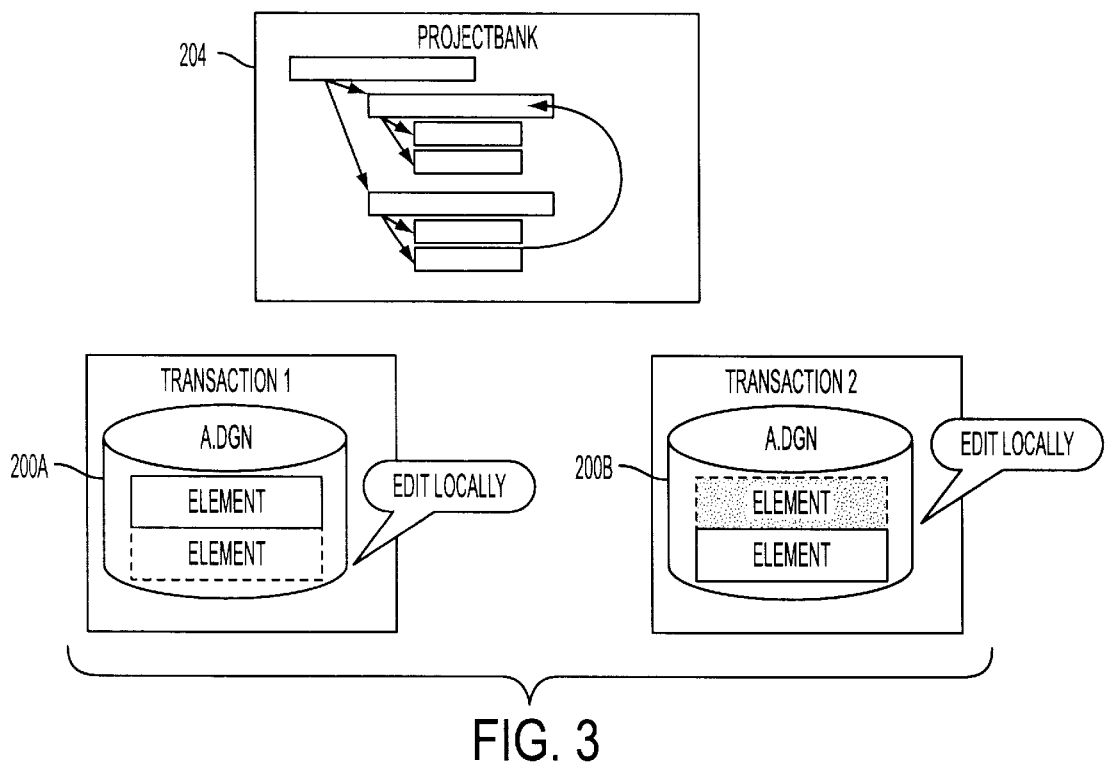

FIG. 3 shows the case where User 2 has changed the first element and User 1 has changed the second. Neither has committed, and the ProjectBank 204 remains unchanged.

A transaction cannot be committed until it is known to be based on the latest committed work of others. The process of merging is called "synchronization." This is the key to how ProjectBank allows fine-grained information sharing using coarse-grained editing tools. During synchronization, the user's local view of the project is updated to reflect all changes committed to the ProjectBank since he started his transaction. Changes that he has made locally are preserved, so he sees his work-in-progress in the context of the latest version of the project.

Once synchronized, a user can post his changes to the server. This is called "committing" the transaction. Commit updates the official copy of the model that exists in the ProjectBank on the server to reflect changes made locally. To do this, intermediary software on the user's machine compares the local design file with the model and transmits the modified components back to the ProjectBank on the server. Updating the ProjectBank creates a new, official version of the project, which all others can see.

Figure 4:
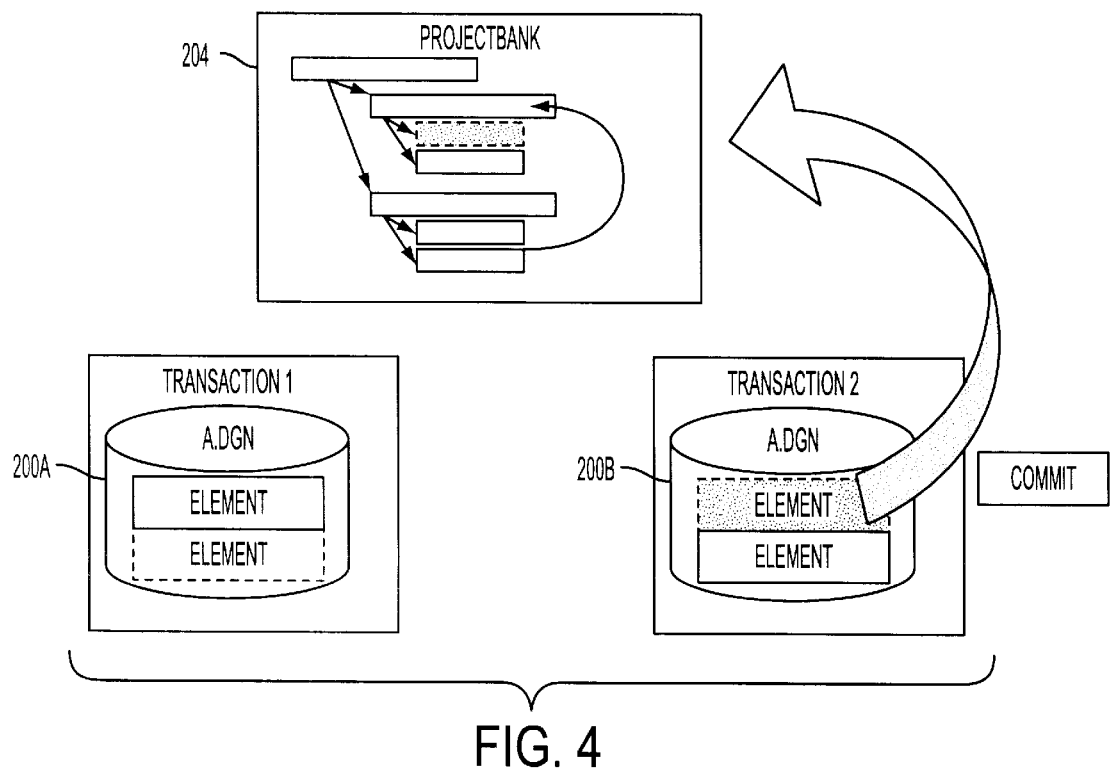
FIG. 4 illustrates a commit process.
Figure 5:
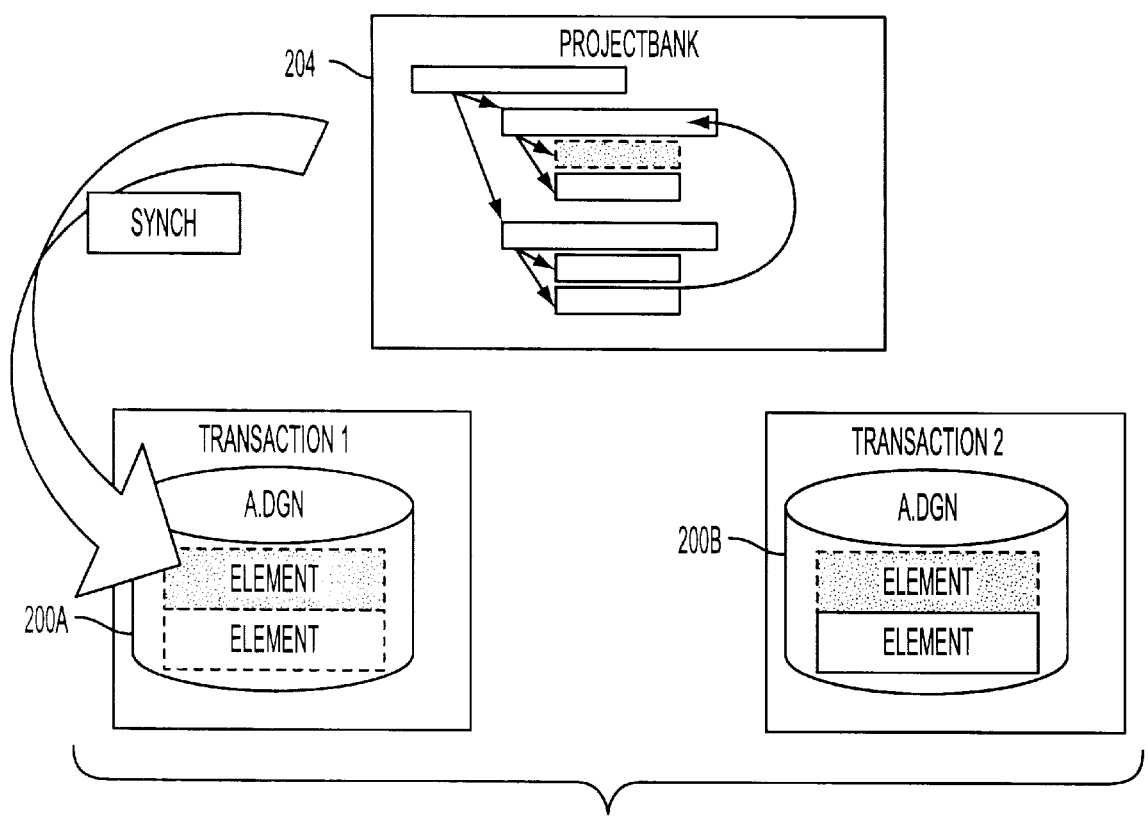
FIG. 5 illustrates a synchronization process.

FIGS. 4 and 5 help to illustrate these concepts. Suppose User 2 commits his change first, as shown in FIG. 4. User 1 is now out of date since he sees the original version of the first element, not the current version in the ProjectBank 204. So, User 1 cannot commit until this is rectified, using synchronization, as shown in FIG. 5.

Synchronization can effectively be pictured as "patching" the user's local copies of the design files, updating the parts of them that others have changed. Commit, in a sense, does the same thing as synchronization, only it runs in the opposite direction—commit appears to patch the Project-Bank's design files in order to incorporate the user's changes. This analogy is intended to show more clearly how users working with files can exchange information at the element level. This is just an analogy, however, as information is actually exchanged in terms of components in a distributed CDB, not as patches to design files.

Another way of looking at synchronization is to consider that a user employs file-oriented tools to operate on a snapshot of the project in time. What he is working on is in the "foreground" of the picture (so to speak). Others may be working on things in the "background." In order to see his changes as others will see them and as they will look in the official version of the project, the user must update the background. This is synchronization.

Normally, because team work is coordinated, changes made by other members of the team will complement, rather than directly conflict with a user's work-in-progress. Sometimes, conflicts will occur, however, and these are flagged by the synchronization process. A transaction cannot be committed until conflicts are resolved. The bedrock requirement of collaborative engineering technology is to prevent collisions from resulting in corruption of the project or loss of work. As discussed below, ProjectBank detects conflicts on at the component level, so that opportunities for conflicts are minimized and the areas of conflict are precisely identified.

Even if direct conflicts do not occur, changes to surrounding or supporting aspects of the project may put the user's own work-in-progress in a new light. One of the chief aims of collaborative engineering technology is to enable the user to discern relevant changes in the surrounding environment. Since ProjectBank performs updates at the component level, it is possible to highlight the areas of change precisely.

VERSION MANAGEMENT

The ProjectBank incorporates a version-management system that maintains a history of how components have been changed by transactions. When commit produces a new version of the project, it first archives the previous version, by recording what components were changed in the "journal" (also known as the "history file"). Projectbank's journaling is based on a common technique in transaction-oriented data management. This also supports a robust fail-safe mechanism. Thus, the ProjectBank can document the history of changes to any component, can restore any version of the project, and can deliver any component as of any historical version on demand, as required by a transaction in progress. The last noted capability is the key to making long transactions expandable.

DETAILS OF OPERATION

ProjectBank is based on a multi-user Component Databank, as described in more detail in the section below entitled "BACKGROUND ON LONG TRANSACTIONS." The master CDB exists on a machine called "the server" (which may in fact be the user's own machine). Each client transaction creates and maintains its own local CDB to serve as a component cache and to buffer uncommitted changes. Since this CDB is unshared and private to a particular client, it is sometimes referred to as the client's "Component Briefcase." His briefcase serves as a hub through which the user obtains model data from the server and transmits changes to the server. These services are provided by intermediary software running on the client machine called the "briefcase manager," which manages his briefcase. The user does not (normally) directly edit components in his briefcase, but such a possibility exists.

All communication between the client and the server is done in terms of components. Most interactions between client and server involve moving stored component data from one CDB to the other, either from server to briefcase when performing synchronization, or from briefcase to server when performing a commit. Design files are never moved between client and server, but are artifacts that are created and processed locally by a briefcase manager.

Figure 6:
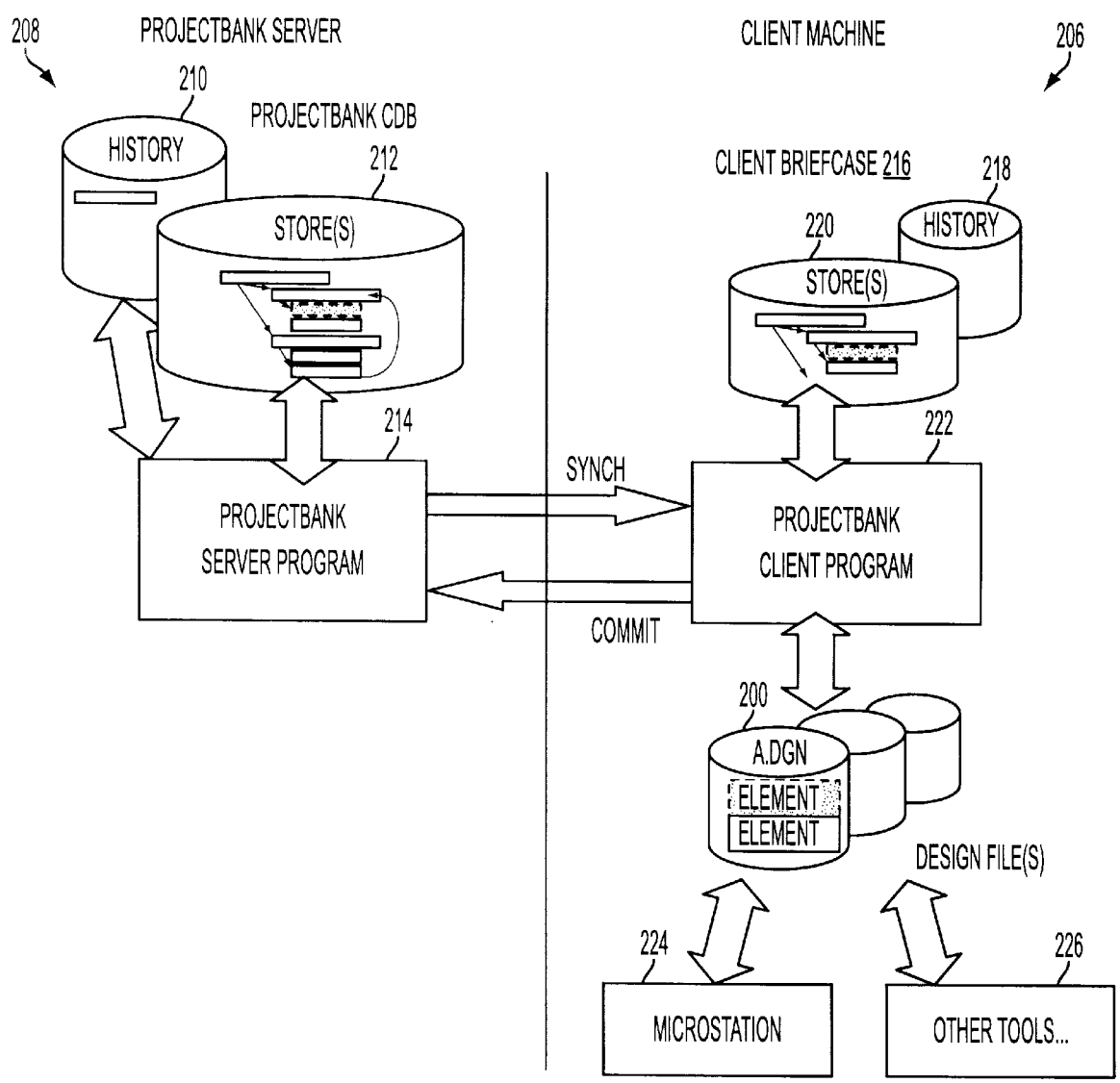
FIG. 6 shows the ProjectBank infrastructure for a single client and server and how design files stand in relation to the permanent project component databank.

FIG. 6 shows the ProjectBank infrastructure for a single client (client machine 206) and server (ProjectBank Server 208) and how design files stand in relation to the permanent project CDB. The ProjectBank Server 208 includes a ProjectBank history 210, Store(s) 212, and a ProjectBank Server Program 214 connected with the store(s) 212. At the client machine 206, there is a client briefcase 216 which includes a local history 218 and local store(s) 220. The client briefcase 216 also includes a ProjectBank Client Program 222 which is in bidirectional communication with the ProjectBank Server Program 214 to facilitate synchronization and commit processes. The ProjectBank Client Program 222 manipulates locally created design files of a model 200 which are edited using conventional file-oriented CAD tools such as MicroStation 224 or other tools 226.

Note that the client briefcase 216 contains a local copy of the portion of the project that the user is working on. This is part of the client/server component buffering mechanism. Component references are preserved, even when not all components are locally resident, as is the case here. Also note that design files 200 are generated from the briefcase 216, not directly from the ProjectBank CDB.

A ProjectBank is initialized by creating an empty CDB on the server. Or, an existing briefcase 216 may be copied to the server 208. If an existing engineering project is being put under ProjectBank, the design files for that project are imported into the ProjectBank. The design files should then be archived and taken out of service. Importing a new design file is described below.

A ProjectBank is made available to clients by starting a "store server" process on the server 208. The ProjectBank Server Program 214 communicates with ProjectBank clients via a mechanism such as sockets.

A user begins a ProjectBank transaction by executing the briefcase manager program on his own machine, specifying the project and model(s) to work on. The ProjectBank Client Program 222 creates a briefcase on the client machine 206 that is tied to the ProjectBank Server Program 214 and is specific to the transaction. After creating the briefcase, the ProjectBank Client Program 222 accesses the project on the server 208, locates the specified model(s) in the project, and generates design file(s) 200 representing the model(s). The user then executes the appropriate editor, such as MicroStation 224, to work on the design file(s) 200.

EXPORT

A generated design file is tied back to the ProjectBank by tagging each design file element with the "Component ID" (CID) of the corresponding ProjectBank component. Since the design file contains only elements generated from components, its contents are completely related back to the ProjectBank via these component tags. An implied limitation on the external formats that are "ProjectBank-able" is that they allow user-defined attribute tags to be stored with each element. If this is not the case, then a more complicated procedure for relating elements with components must be used, such as external files. This procedure can turn out to be unworkable. Fortunately the most relevant engineering formats, MicroStation DGN and AutoCAD DWG both allow such tagging. As long as the file-oriented editor preserves tags, the return trip is possible.

Figure 7:
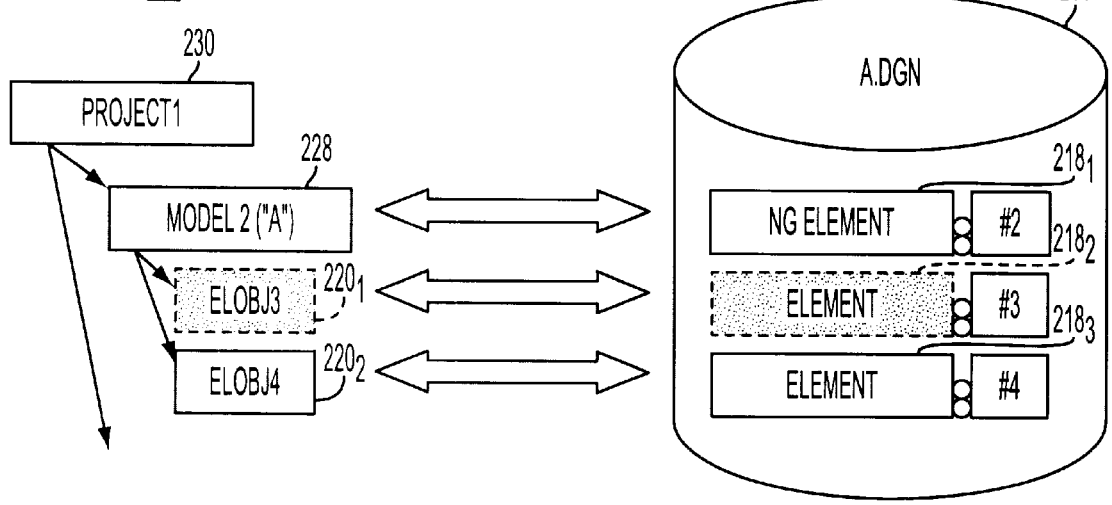
FIG. 7 shows how elements are related to components.

FIG. 7 shows how elements ($218_1$, $218_2$, $218_3$) are related to components ($220_1$, $220_2$) in a typical scenario. FIG. 7 shows the entire briefcase 216, as it would relate to a design file 200 extracted to represent a single model 228 within the project 230. Note that each component in the project, regardless of its type and whether it represents a model as a whole or an element within a model, has a unique CID of its own.

INCREMENTAL IMPORT

After using a file-oriented tool to edit the design file, the user may commit the transaction, posting his changes to the shared project information databank on the server. To do this, he invokes the commit operation in his project server program. Project server performs an incremental import, analyzing the changes to the design file. The only possibilities are that elements have been changed, deleted, or added or copied.

CHANGE: For components that still have their component tags, the incremental import process can look up the corresponding component from the tag. The component's data are compared to the element data. If different, the editor changed the element, and the incremental import updates the component's data (without changing its CID) from the element. The component is marked as changed and scheduled for commit to the server.

COPY: If an element is copied, including its component tag, then the incremental import will find more than one element referring to the same component. In this case, it assumes that the second occurrence and following are copies and treats them as adds.

ADD: If an element has no component tag (or is a duplicate), a new component is created in the model to represent it. The new component is scheduled for commit.

DELETE: If, after the import has analyzed the design file, no element was found corresponding to some existing component that had been previously exported, we can infer that the editor deleted the element. The orphaned component is deleted in response, and the change is scheduled for commit.

Figure 8:
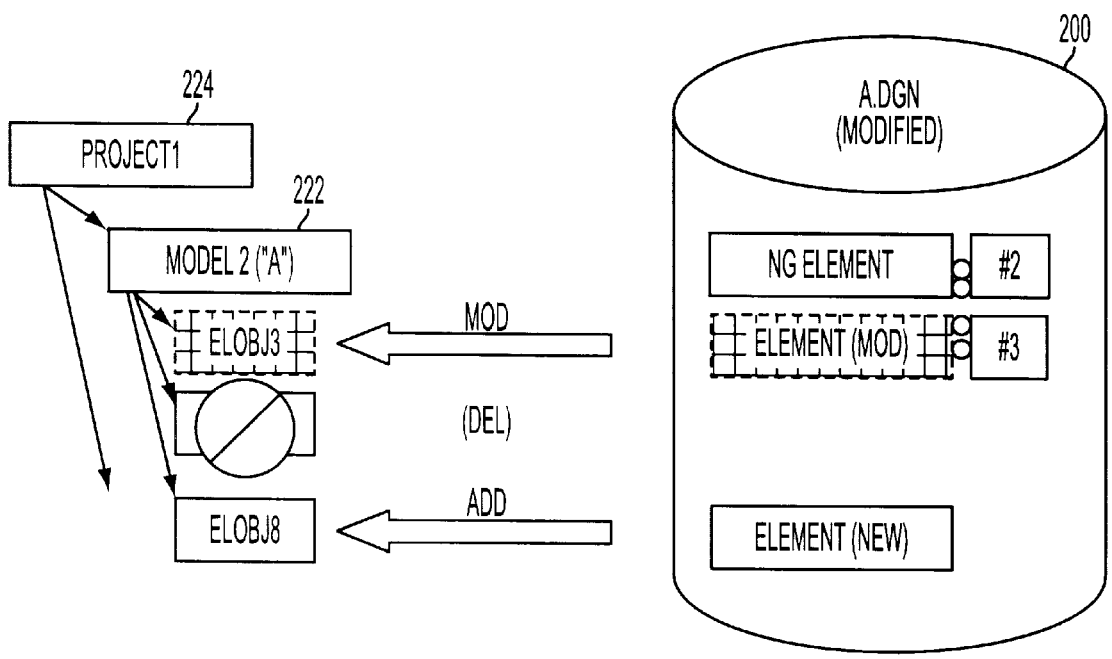
FIG. 8 shows an example of how a design file looks after editing and how an incremental import would relate it to the original model.

FIG. 8 shows an example of how a design file 200 might look after editing and how an incremental import would relate it to the original model 228. An incremental import is treated as any other change in the ProjectBank environment: after import updates the model and its components, the changes are validated. At this stage, the wrapping schema may apply custom verification logic. Assuming that validation succeeds, the changes are written in an all-or-nothing fashion to the briefcase, which buffers the changes to be committed to the server.

IMPORTING NEW DESIGN FILES

Importing a new design file is just like incrementally importing a design file that has nothing but adds. The only difference in this case is that a new model must also be created and added to the project. The need to import new design files arises when a ProjectBank is bootstrapped from an existing project and when the user creates new design files locally and references them into an existing model.

SYNCHRONIZATION

Figure 9:
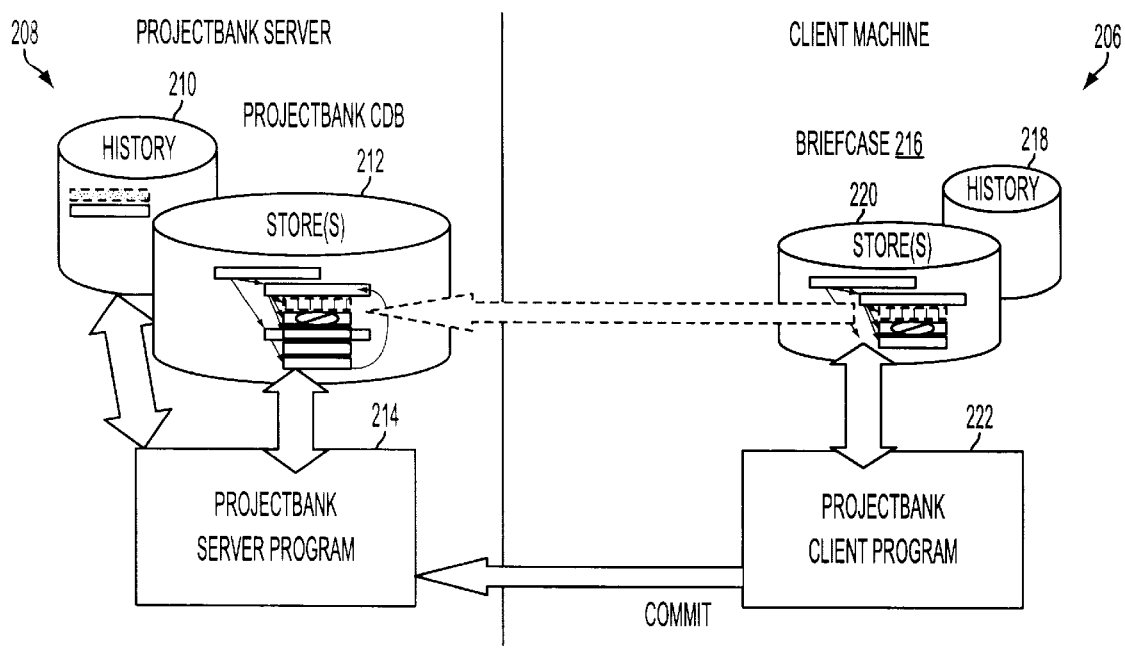
FIG. 9 shows the ProjectBank infrastructure for a single client and server and helps to explain the synchronization process.

FIG. 9 shows the ProjectBank infrastructure for a single client (client machine 206) and server (ProjectBank server 208) and helps to explain the synchronization process.

At the point of synchronization and long-transaction commit, the ProjectBank Client Program 222 must be connected to the server 208, if it wasn't already connected.

If the local transaction is not synchronized, this must be done before committing to the server 208. Synchronization is done at the component level. As explained in greater detail in the section below entitled "BACKGROUND ON LONG TRANSACTIONS," each component that is known to the briefcase 216 is checked on the server 208. If a component has been modified on the server 208 since the transaction was last synchronized, it must be updated in the briefcase 216. If the component has not been modified locally, then it is reloaded from the server 208. If the component has been modified locally, then a conflict occurs. The ProjectBank Client Program 222 and the wrapping schemas try to resolve conflicts automatically, whenever possible. For example, changes to indexes, such as a spatial range tree, can always be resolved automatically. At this point the wrapping schemas can apply custom merge logic to resolve apparent conflicts. For example, if two users have changed two different aspects of the same component, then the schema may be able to merge them. This may happen frequently in the case of attribute data attached to elements and maintained by vertical applications. Wrapping schemas specific to these applications can be added to ProjectBank to the handle these cases.

If there are unresolved conflicts, that is, components that have been modified and committed by another user and have also been changed locally, then commit is blocked, and the user must be notified so that he can rectify the problem. At a minimum, the updated picture of the model, plus an indication of the conflicts, must be returned to the user. This entails re-exporting the model to a design file and executing a viewer. (Note: the user's uncommitted local changes are not lost in this process, so re-exporting the design file is not dangerous. Only the non-conflicting changes from the server were downloaded, and conflicting changes were flagged but not downloaded.) The manner in which conflicts are indicated is a detail that may vary from tool to tool and schema to schema. The manner in which the user can use an editing tool to resolve conflicts and how this information is conveyed back to the project server will also vary.

Once synchronized, the transaction can be committed. The ProjectBank Client Program 222 tranmits every new or modified component to the ProjectBank Server Program 214, which updates the master copy of these components in the ProjectBank. The preexisting versions of the affected components are written to the ProjectBank history 210. Long transaction commit is an all-or-nothing operation. If either client 206 or server 208 crashes or cancels during the process, the commit does not go through and the ProjectBank is not updated. In that case, the client 206 can try again at another time.

Once committed the user is up-to-date, his current transaction is renewed, and he may resume working on the same model(s). Or, the user may start a new transaction to work on a different model(s).

BACKGROUND ON LONG TRANSACTIONS—OVERVIEW

The goal of concurrent engineering is to enable multiple users to work on the same design concurrently, each contributing his own expertise in a way that builds on and complements the work of others. The mechanism described here allows multiple users to access a shared computer model concurrently in a way that allows each user to work freely on the model using familiar tools without file-sharing constraints, and then smoothly merge his work into the stream of changes produced by others.

BACKGROUND ON LONG TRANSACTIONS—THE PROJECTBANK SERVER AND LONG TRANSACTIONS

At any given time, there is only one approved and universally observable copy of a model. This is called the "tip" version and it exists on the ProjectBank server. To work on a model, a user makes a virtual copy of it on his computer. (It is possible to start work from a version other than the tip, but as will be illustrated below, commits are always made to the tip. Therefore, edits that start from a non-tip version but commit to the tip, must explicitly state that they wish to "overwrite" the intervening versions.) The copy is tied to the server and may be re-synchronized with it or merged back into it, as discussed below. Work on a virtual copy of a shared model (a "briefcase") is called a "long transaction." Each user executes his own long transaction(s) against the project server. The long transaction is the basis for concurrency control.

Each virtual copy is isolated from changes made in any other and to changes made to the tip version, so that the model always appears to the user to be in the state that was obtained when he started his long transaction, plus any changes he has made to it himself. In other words, the virtual copy appears to the user to be a full local copy of the model. (In reality, it is not always necessary to make a full local copy. The caching strategy is described below.)

A user may modify his virtual copy in any way that he likes. If the user creates a new version of the model, it is called his "local version." No other user would see this local version inside a briefcase, so long as the long transaction is executing. A long transaction is expected to last for a significant amount of time, reflecting the nature of engineering design work.

BACKGROUND ON LONG TRANSACTIONS—LONG TRANSACTION SYNCHRONIZATION AND COMMIT

A user may attempt to promote his local version to become the tip version, so that all other users would see it and work on it. This operation is called "committing" the long transaction. Committing essentially replaces the permanent version of the model with the user's copy of it. (As discussed below, only the changed parts of the model need be updated.)

To prevent one user from inadvertently overwriting another's work, a local version must be "synchronized" before it can be committed. Synchronizing means putting a user's briefcase on the basis of the most recent work available from all other users. If a user starts with an early version of the model and changes it, while, meanwhile, another user modifies the model and commits his changes first, then the first user is not synchronized—he must take account of the second user's changes before he can commit his own. If the first user has in fact changed some of the same aspects of the model as the second, then synchronizing will reveal that the two changes are in "conflict." The two users must discuss the conflict and the first user must resolve it by backing off, adapting, or asserting his own work in response. If, in another scenario, the first user had not changed the same aspects of the model, then the second user's changes would not be in conflict. Synchronization in this case would simply cause the first user's copy of the model to absorb and reflect the second user's changes. Once a local version is synchronized, it can be committed, to become the basis for other users work. The mechanics of synchronization are discussed in greater detail below.

When making changes, a user's goal is to move the model to a new, valid state. The validity of a model can be defined at many levels. At the primitive level, a model is defined by a set of schemas, that is, a set of related classes, which contain data definitions and design rules among other things. A model is in a valid state if the validation rules of the schemas have been executed to verify and react to the user's direct modifications. The goal of synchronization can be restated as producing a new, valid version of the model, by applying the outside changes to the local version. These outside changes are applied atomically and are validated, just as a local change would be handled. This is explained in more detail at the component level.

The process of injecting and validating another user's changes into one's own version is call "merging." While synchronization sometimes reveals direct conflicts and sometimes reveals no overlap at all between one user's work and another user's work, it often entails an attempt to synthesize the work of two or more users. It may be that changes made locally to the model have created a context in which the other user's changes are not workable. Or, it may be that the outside changes will look different in the local version than in the tip version, perhaps because of the way changes "ripple through" relationships and are combined to produce a model's state. This will become clearer in the detailed explanation of synchronization at the component level.

C. DETAILED DESCRIPTION

Figure 10:
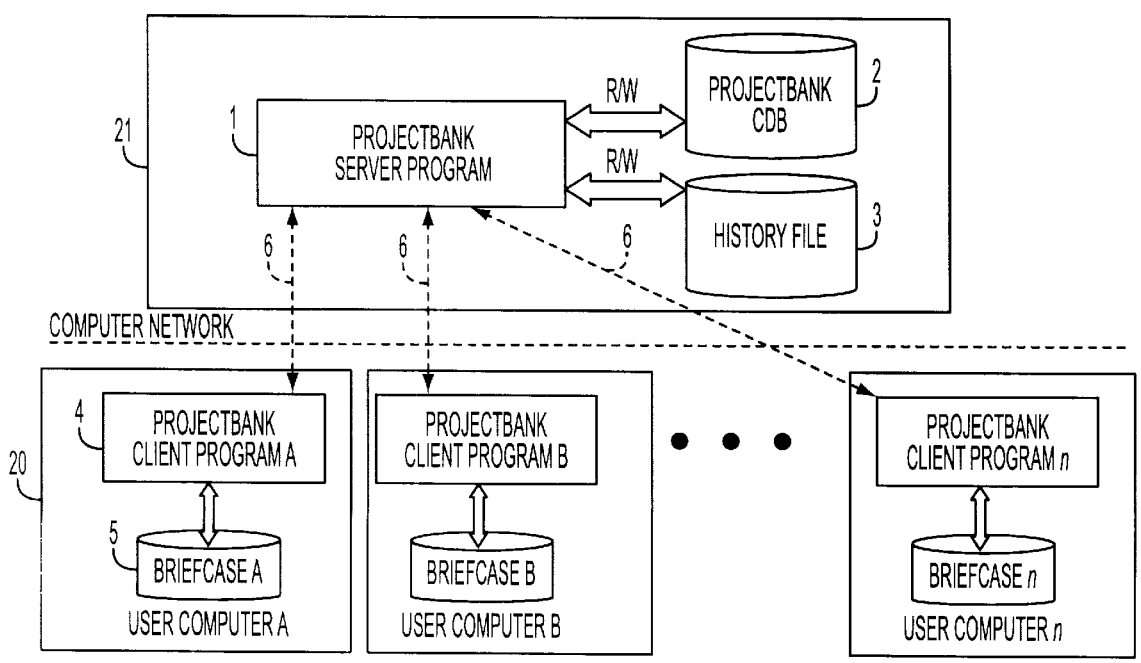
FIGS. 10 and 11 show a preferred embodiment of the present invention which includes two separate computer programs, a ProjectBank Server Program and a ProjectBank Client Program, and associated data formats.
Figures 11, 12:
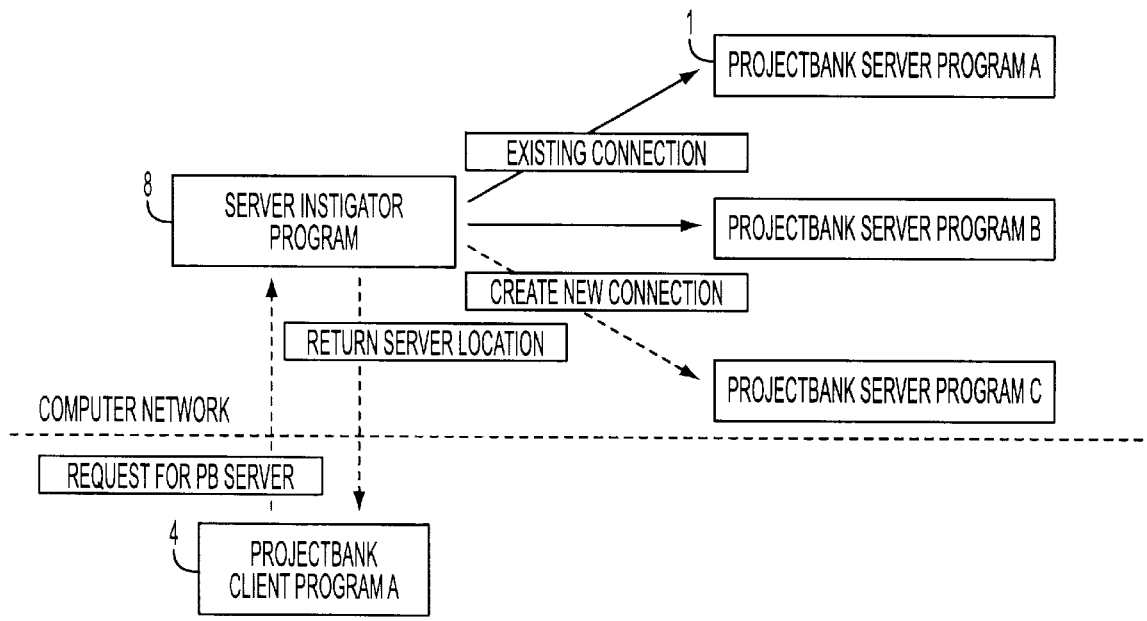
FIG. 12 shows an external registry for use with the ProjectBank Server and Client Programs.

FIGS. 10 and 11 show a preferred embodiment of the present invention which includes two separate computer programs: a ProjectBank Server Program 1 and a ProjectBank Client Program 4, and associated data formats. These two programs are loaded into memory and executed on the same user computer 20, or they can be loaded on two different computers 20 and 21 connected by a computer network, or they can be combined into a single program.

THE PROJECTBANK SERVER PROGRAM

The ProjectBank Server Program 1 is the central hub for controlling access to the project data, and for coordinating and recording changes to project data. The ProjectBank Server Program 1 executes on a ProjectBank Server Computer 21. For a given project, there is one ProjectBank Server Program 1 available over a computer network. The ProjectBank Server Program 1 creates, opens, operates on, and maintains the ProjectBank CDB 2. Preferably the ProjectBank CDB 2 is a single file or a controlled collection of files containing the components 10 that comprise the current version of the project. However, the ProjectBank CDB 2 can also be some other form of long-term storage facility such as a structured store or a relational database. The ProjectBank Server Program 1 also creates, opens, and operates on and maintains the Project History file 3, which contains a list of all changes to components 10 in the project.

No other program or computer directly accesses the ProjectBank CDB 2 or the Project History file 3. Instead, users on individual computers 20 execute ProjectBank Client Programs 4, which connect to the ProjectBank Server Program 1 to obtain or change components 10.

PROJECTBANK CLIENT PROGRAMS

ProjectBank Client Programs 4 execute locally on an individual project participant's computer 20. A ProjectBank Client Program 4 finds the location and name of a ProjectBank Server Program 1 through an external registry 7 of such known servers, as shown in FIG. 12, and makes a connection using standard network socket techniques. The registry 7 is preferably a simple text-based file on a known shared file server containing a list of available projects and information necessary to establish a connection to a ProjectBank Server Program 1. Once it has located a ProjectBank Server Program 1, the ProjectBank Client Program 4 creates a network connection 6 between the two using standard protocols, preferably TCP/IP protocols. This connection 6 remains open for some period of time, and all communications between client and server are made through the connection 6. If, for some reason, the connection 6 becomes broken, the client 4 automatically attempts to reconnect to the server 1.

In addition, if a plurality of projects are resident on a server computer 21, but only a subset of those projects are "active" at a time, then a third program may run on the server computer 21 called a Server Instigator Program 8. The role of the Server Instigator Program 8 is to receive requests from a ProjectBank Client Program 4 for a ProjectBank Server 1 for a project, and return the location of the ProjectBank Server 1 if it is already active, or to activate a ProjectBank Server 1 and then return its location.

Figure 13:
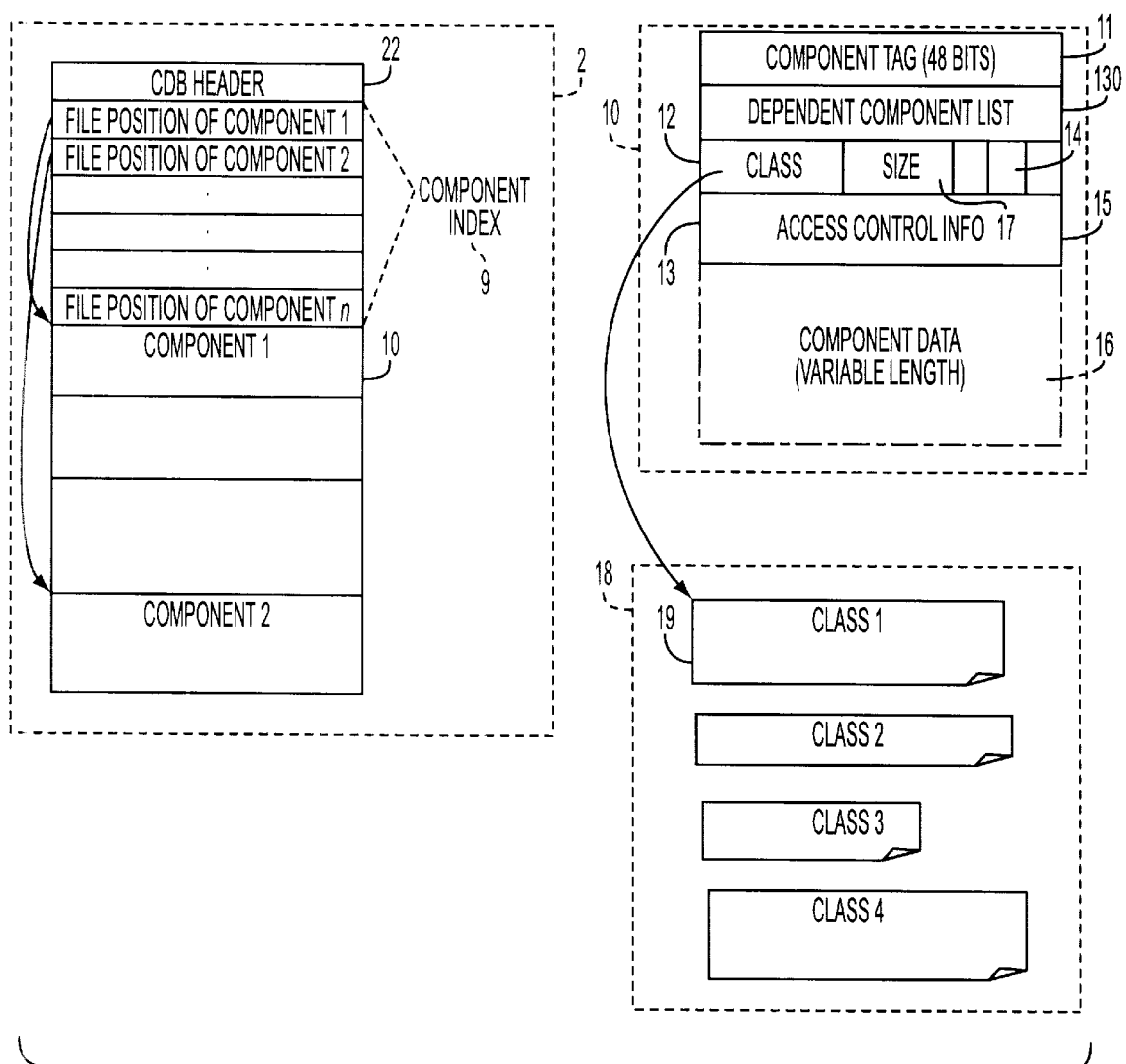
FIG. 13 shows the format of the contents of a component databank.

FIG. 13 shows the contents of a component databank (CDB). Components 10 are stored in a file, or a plurality of files, residing on disks attached to the ProjectBank Server Computer 21, called a ProjectBank CDB 2. Each component 10 in the ProjectBank CDB 2 is assigned a unique identifier 11 (i.e., a component ID or tag), such as a 48 bit identifier, that is unique with respect to all other components 10 in the ProjectBank CDB 2. The data 16 for a component 10 is written to the ProjectBank CDB 2 along with a header 15 called a "storage node." The storage node 15 holds the size 17 of the component, the class 12 of the component, the component tag 11, access control information 13, and additional flags 14. Preferably, the storage node 15 also contains a dependent component list 130 which is a pointer to a variable length list of other components 10 that hold a reference to the current component 10 as a part of their data 16.

The access control information field 13, preferably a 16-bit value, may be used to restrict access to a component 10 for various purposes. Preferably, the ProjectBank Client Program 4 examines the value of the access control information field to determine what permissions should be granted for the component 10. Possible access restrictions can include (in order of decreasing restrictiveness):

(1) no access whatsoever, (2) read-only access, (3) "shrouded" access (i.e., the component 10 only reveals minimal information about itself), (4) backpointer-additions only (i.e., allow other components 10 to become dependents and therefore change the dependent component list 130 of this component 10), (5) validation changes only (i.e., allow changes that result from responses to other components 10 on which this component depends), or (6) full access.

For fast component 10 lookups, the ProjectBank CDB 2 holds an index 9 that maps component tags 11 to file positions. The component tag values 11 are written into the storage node 15 to ensure consistency with the index 9 and to enable the re-creation of the index 9 in the case of file corruption.

The component index 9 can be broken into many smaller sub-indexes to optimize access time and disk space requirements. Since the ProjectBank CDB 2 has numerical component tags 11, effective use can be made of a "sparse array" data structure to implement the component index 9. In the common case, a ProjectBank CDB 2 will use only a small fraction of the very large potential range of values ($2^{48}$) and it is therefore desirable to avoid creating many interior nodes. The preferable way to implement a sparse array for purpose of the component index 9 is to use a multi-way radix tree. As is known, a radix tree is a look-up tree where navigation is guided by picking apart a numerical key. A multi-way tree has "n" branches out of each node.

In the case of a ProjectBank CDB 2, a (virtual) 6-level tree may be used wherein each node has 256 branches. The 48-bit component tag 11 can be treated as a base-256 number with 6 coefficients, each being an 8-bit number. Each coefficient tells us which branch of the tree to take at its level. One skilled in the art would recognize that it is not necessary to physically represent any more of the tree than is actually in use. A ProjectBank CDB 2 with component tags 11 in the range of $0 \ldots 2^{16}$ only requires a tree with 2 levels. The range $0 \ldots 2^{24}$ requires only 3 levels. To make the tree as small as possible, a form of "level-compression" can be used which just keeps track of how wide the tree actually is, and knows how many upper levels to skip when indexing into it.

When adding a new component tag 11 value that is out of range, the tree is widened by adding levels at the top. It is always known where to splice in the existing tree into the new, wider tree: at the left, since it is being widened. In fact, the existing tree remains intact It is only necessary to create "n" new upper-level interior nodes, the last of which points to the top of the existing tree, and then point the tree root at the new top-level node.

To ensure that components 10 can be loaded into memory and interpreted in any environment that accesses the ProjectBank CDB 2, the classes 19 that define a component 10 may, themselves, be stored in the ProjectBank CDB 2. The techniques for accomplishing this are explained in U.S. Pat. No. 5,815,415.

THE PROJECTBANK HISTORY FILE

Figure 14:
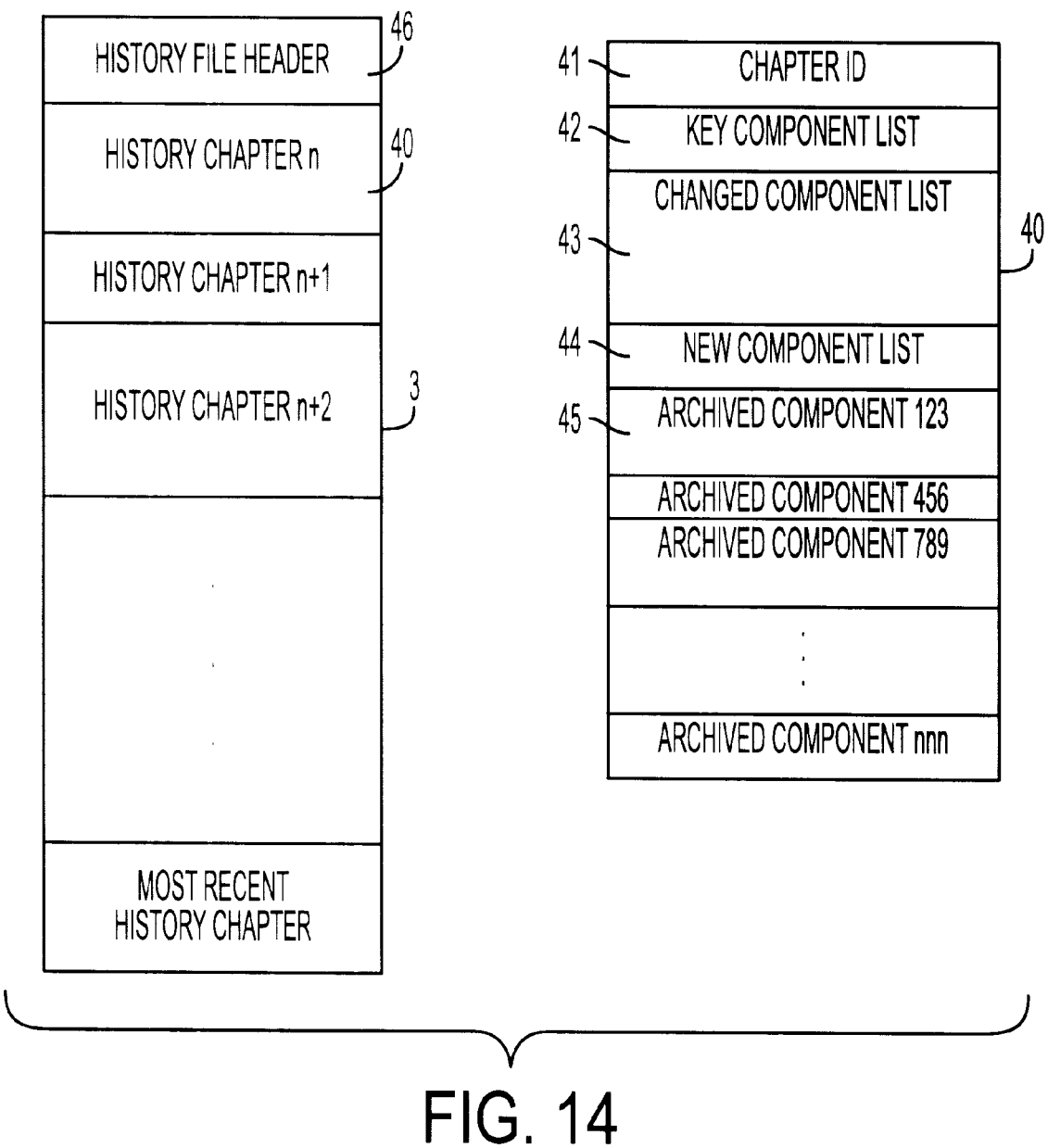
FIG. 14 shows one preferred embodiment of how component histories are tracked.

FIG. 14 shows one preferred embodiment of how component changes can be tracked. At any point in time, many archived versions 45 of any component 10 in the project may exist, since the same component 10 can appear in many history chapters 40 (for a given history chapter 40, a given component 10 can appear only once). These archived versions 45 represent the history of all changes made to the component 10. One version of a component 10 is the most recent version, called the "tip" version, and is stored in the ProjectBank CDB 2.

Whenever a change to a component 10 is to be stored by the ProjectBank Server Program 1, it first archives 45 the current tip version by recording its state 10 to the ProjectBank History File 3 as an entry in a history chapter 40. By subsequently recalling this archived version 45, the ProjectBank Server Program 1 can document the history of changes to any component 10, and it can deliver any component 10 as of any historical chapter (corresponding to a date) 40 on demand.

The ProjectBank History file 3 is organized as a journal. That is, it holds a chronological list of the changes to the ProjectBank CDB 2 in the form of chapters 40. Each chapter 40 has a chapter ID 41 that is a unique, monotonically increasing, value to identify the chapter. Preferably, a chapter ID 41 is a 64-bit integer.

Each history chapter 40 holds a list 43 of the components 10 that were changed in chapter 40, and a list 44 of the components 10 that were added during the chapter 40. These lists 43 and 44 can be used to quickly tell whether and when a particular component 10 was modified or created. For each entry in the changed component list 43, a corresponding archived version 45 of a component 10 is held in the history chapter 40. This archived version 45 of the component 10 contains its state before the transaction that created the chapter 40. There is no need to store an archived version 45 for entries in the new component list 44 since those components 10 did not exist before the transaction that created the history chapter 40.

In some cases, it may be known that only small portions of large components are changing in a transaction. In this case, rather than storing a complete copy of the archived component 45 in the history chapter 40, a "difference description" may be stored. For example, the archived component 45 section would be replaced with a table holding (byte-offset, old value) pairs. Alternatively, the table comprised of (byte-offset, length, old values) runs could be saved.

Each history chapter 40 also contains a list 42 of "key components" to designate high-level components contained in the chapter 40. The purpose of the key component list 42 is to increase performance of history chapter 40 searches. By designating a small subset of components 10 as "key" components 10, a shorter list 42 can be searched. The components that are put in the list of key components 42 are determined by schema 18. Key components are part of the logical format of the ProjectBank History file 3, not its physical format. That is, there are no special records for key components; physically, they are simply stored as archived components 45.

ProjectBank Client programs 4 may also save extensive change-description information with each history chapter 40 to document the engineering purpose of the change, or other information as may be relevant. This process does not require special support from the ProjectBank History file 3 since such change-description information can simply be held by a new component 10 that is created for every history chapter 40.

The ProjectBank Server Program 1 also uses the ProjectBank History file 3 to support fail-safe transaction commit. To do this, the ProjectBank Server Program 1 implements a standard technique for logging in-place updates and implements the standard undo recovery mechanism using the history file 3 in a process commonly known as a "physical undo log." (See, for example, Bernstein, P. A. et al. "Concurrency Control and Recovery in Database Systems," Addison-Wesley Publishing Company, Reading, Mass., 1987.) Briefly stated, The ProjectBank Server Program 1 creates and controls all access to the history file 3. The ProjectBank Server Program 1 first writes a well-known header 46 to the history file 3 that has a unique signature (so that 1 can tell that it is looking at a valid history file 3).

The ProjectBank Server Program 1 updates directly into the ProjectBank CDB 2 only after it first sets a 'pending' flag in the history file header 46 and flushes it. When the commit is finished, the 'pending' flag in the history file header 46 is cleared and flushed. In the event of a crash or other interruption of the commit (indicated by the persistence of the 'pending' flag in the history file header 46), the recovery manager inspects the history file 3 to determine what update operations must be undone, thereby returning the ProjectBank CDB 2 to its last known good state.

The history file header 46 also holds a seed-value that is used to assign new chapter ID's 41 to ensure uniqueness. This seed-value is updated every time a new chapter 40 is written to the history file 3.

BRIEFCASES

Figure 15:
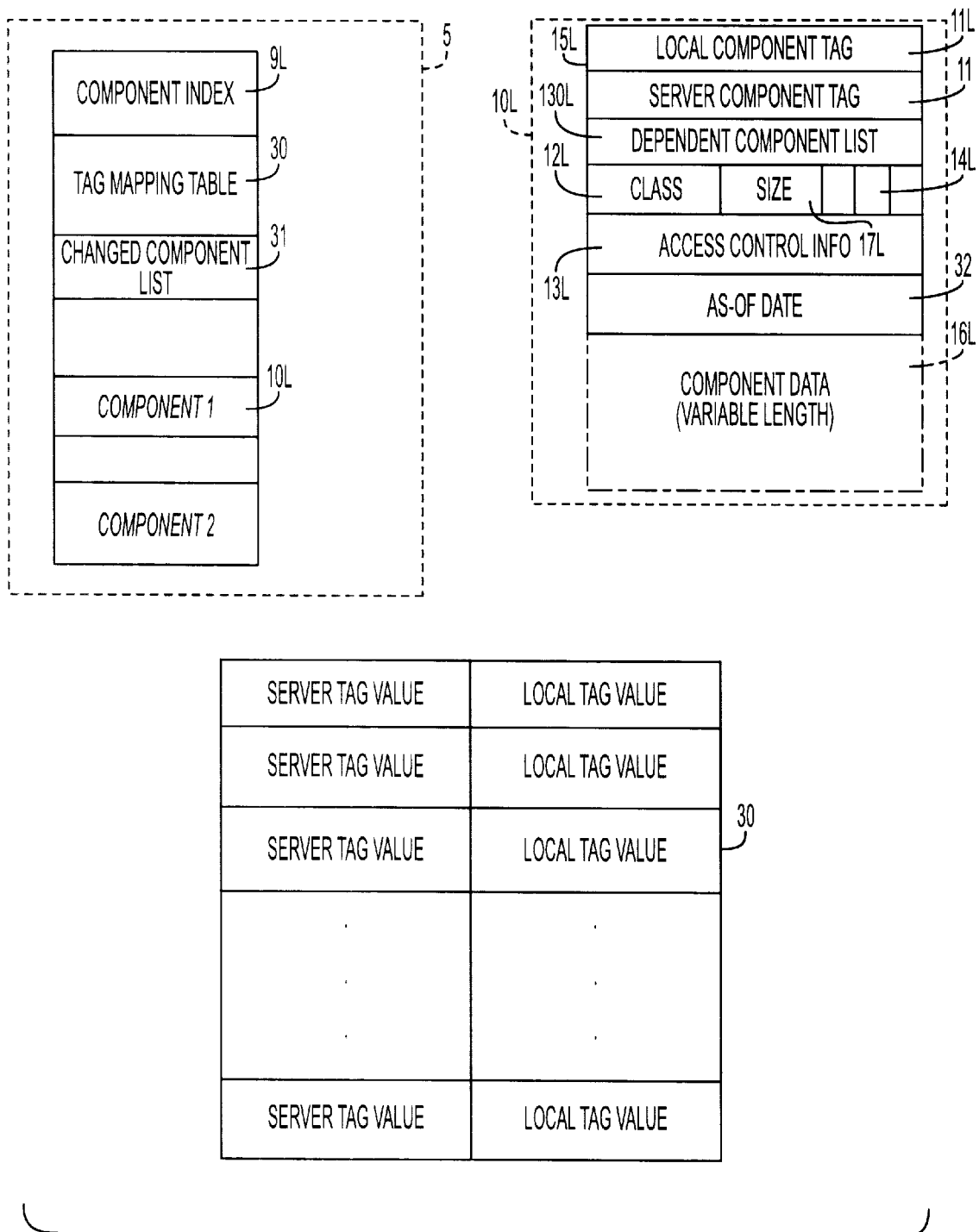
FIG. 15 shows how components are stored and manipulated in a briefcase of a client computer.

FIG. 15 shows how components 10 are stored and manipulated in a briefcase 5 of a client computer 20. To modify a subset of the components 10 in a ProjectBank CDB 2, a ProjectBank Client Program 4 makes a local copy of those components 10L on the client computer 20. These components 10L are stored in a local file 5 called a "Briefcase." The briefcase 5 maintains an index 9L of the file positions of the local components 10L in the same manner as the ProjectBank CDB 2. Each component 10L in a briefcase 5 is marked with the version (or "as-of" date) 32 from which it was retrieved from the server. The as-of date 32 is preferably a 48-bit integer indicating the number of seconds from some known starting time. Each briefcase 5 is isolated from and independent of changes made in any other briefcase 5, and to changes made to the version in the ProjectBank CDB 2. This means that the ProjectBank CDB 2 always appears to the user to be in the state that it was obtained when the user started or synchronized (see below) his briefcase 5, plus any changes that the user made to it.

All communication between the client 4 and the server 1 occurs in terms of components 10. Most interactions between client 4 and server 1 involve moving stored components 10 from one to the other, either from server CDB 2 to briefcase 5, in the case of synchronization, or from briefcase 5 to server CDB 2, in the case of commit.

Preferably, the briefcase 5 is processed by a computerized modeling system (CMS) similar to that described in U.S. Pat. No. 5,815,415 wherein local components 10L are "faulted" into memory as they are referenced through other resident local components 10L. When the CMS attempts to reference a local component 10L that is not yet resident in the local briefcase 5, it is "faulted" (copied, transparently to the program) down from the ProjectBank CDB 2 automatically. The referenced component 10L is retrieved from the ProjectBank CDB 2 by the ProjectBank Server Program 1 with the as-of date 32 of the referencing local component 10L. In this manner a consistent view of the ProjectBank CDB 2 is maintained, and the virtual copy of the Projectbank CDB 2 in the briefcase 5 appears to the user to be a full local copy.

As in the ProjectBank CDB 2, components 10L in a local briefcase 5 are each assigned a unique component tag 11L. However, when a particular component 10 is transferred from the ProjectBank CDB 2 to a briefcase 5, it is assigned a new local tag 11L that will likely be different from the tag 11 in the ProjectBank CDB 2 (and will be independent of tags 11L used for the same component 10 in other briefcases 5). The briefcase 5 holds a mapping table 30 between server tags 11 and local tags 11L. In this manner, it is always possible to translate server tags 11L to local tags 11. In addition, both the local tag 11L and the server tag 11 are stored in the local storage node 15L. In this manner, a server tag 11 can be quickly obtained given a local tag 11L, to ensure consistency with the tag mapping table 30, and to enable the re-creation of the tag mapping table 30 in the case of file corruption.

A user may modify components 10L in his briefcase 5 in any manner. No other user sees these local changes inside a briefcase 5. The first time any component 10L is modified, or if a new local component 10L is created, its local tag value 11L is written into a list 31 of locally changed components 10L. This list 31 is stored in the briefcase 5 so that it is always possible to quickly tell which local components 10L are new or potentially different from their corresponding component 10 in the ProjectBank CDB 2.

Newly created components 10L in a briefcase 5 are assigned a new, unique, local tag 11L, but their server component tag 11 will have the value 0, which is a reserved value. Also, new local components 10L do not have a corresponding entry in the server-to-local mapping table 30. Upon a request to "commit" local changes in a briefcase 5, the ProjectBank Client Program 4 contacts the ProjectBank Server Program 1 and requests a new server tag 11 for each of the newly created components 10L in the briefcase 5.

SYNCHRONIZE AND COMMIT

A user on a first computer 20 may attempt to promote the local version of components 10L in his briefcase 5 to become the tip version in the ProjectBank CDB 2 so that users on other computers 20 can see them and work on them. This operation is called "committing" the briefcase. Committing essentially replaces the version of the components 10 in the ProjectBank CDB 2 with the user's local version 10L.

To prevent a user on a first computer 20 from inadvertently overwriting the already-committed changes to a component 10 by a user on a second computer 20, the local version of that component 10L must be "synchronized" before it can be committed. Synchronizing means putting the local components 10L in a briefcase 5 on the basis of the most recent work available in the ProjectBank CDB 2. If a user on a first computer 20 starts with an early version of a component 10 and makes changes to it 10L, while another user on a second computer 20 modifies that same component 10 and commits it, then the user on the first computer 20 is not synchronized. The user on the first computer 20 must take account of the changes made by the user on the second computer 20 before the user on the first computer 20 can commit his version. If the user on the first computer 20 has, in fact, changed some of the same aspects of the component 10 as the user on the second computer 20, then synchronizing will reveal that the two changes are "in conflict." Before a component 10L can be committed to the ProjectBank CDB 2, any conflicts on the component 10L must be resolved (see below).

Figure 16:
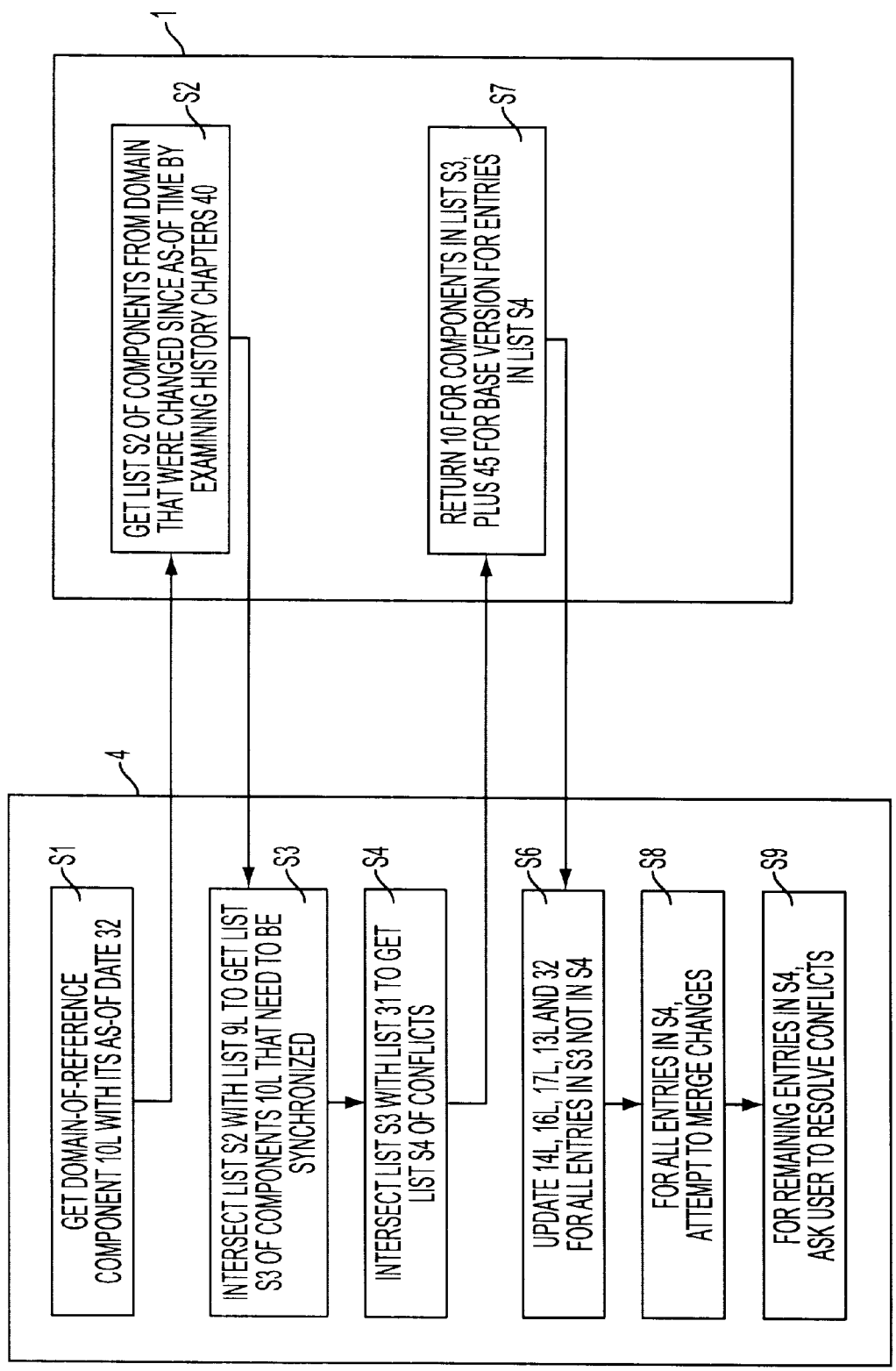
FIG. 16 is a flowchart of a synchronization process.

Synchronization is accomplished by comparing the as-of date 32 for components 10L in the local briefcase 5 against all newer entries 45 in the ProjectBank History file 3. Any component 10 that is newer in the ProjectBank CDB 2 than the as-of date 32 in the briefcase 5 is transferred from the Projectbank CDB 2 to the briefcase 5 and its as-of date 32 in the briefcase 5 is updated, as illustrated in FIG. 16.

Preferably, the briefcase 5 is processed by a CMS similar to that described in U.S. Pat. No. 5,815,415 wherein a Transaction Manager enforces global consistency on the set of resident components 10L by means of a "validation process." The validation process enforces that any component 10L that depends on any other component 10L is loaded into memory and its validation rules are processed before the target component 10L is written to the briefcase 5. As a result of this process, the set of components 10L in the briefcase 5 is always globally consistent with respect to validation and dependency rules for the ProjectBank CDB 2 as a whole, and it is always possible to commit or synchronize an entire briefcase 5.

However, it is also possible to synchronize or commit just a subset of the components 10L in a briefcase 5. To determine which subset of components 10L can be synchronized or committed independent of other components 10L in the briefcase 5, it is only necessary to perform a "domain-of-reference" analysis on the components in the commit or synchronization set. A domain-of-reference test involves analyzing a set of changed components 10L to determine which components have a "dependency path" (any path that can be used to navigate, following forward references, from one component to the other) to other components in the set. In the case of synchronization (FIG. 16), the set of changed components is determined from the ProjectBank History file 3 in the changed component list 43 of each history chapter 40. In the case of commit, the list of changed components 31 resides in the briefcase 5. Preferably, components 10L are stored according to the techniques described in U.S. Pat. No. 5,815,415 where a list of dependent components is saved with each component, in which case the domain-of-reference test is a straightforward backpointer traversal. Otherwise, an exhaustive forward pointer analysis is necessary.

CHANGE MERGING AND CONFLICT RESOLUTION

FIG. 16 is a flowchart of one example of a synchronization process, including nine self-explanatory steps S1–S9. The process of synchronizing local components 10L in a briefcase 5 with the tip version of those components 10 can uncover some components that were changed on more than one user computer 20 (step S4 which generates list S4). There are two possibilities for any component 10 in that category: compatible change (i.e., resolvable change) or conflicting change (unresolvable change). Compatible changes occur when different aspects of the same component 10 are changed in more than one briefcase 5. During the synchronization process, whenever the ProjectBank Client program 4 detects that a component 10 was changed both on the server 10 and in the local briefcase 10L, an attempt is made to determine whether the changes are compatible or conflicting. Preferably, the briefcase 5 is processed by a CMS in a manner similar to that described in U.S. Pat. No. 5,815,415, wherein a "merge" method is called on the component 10L. Otherwise, some external or predefined merging process must be employed.

Figure 17:
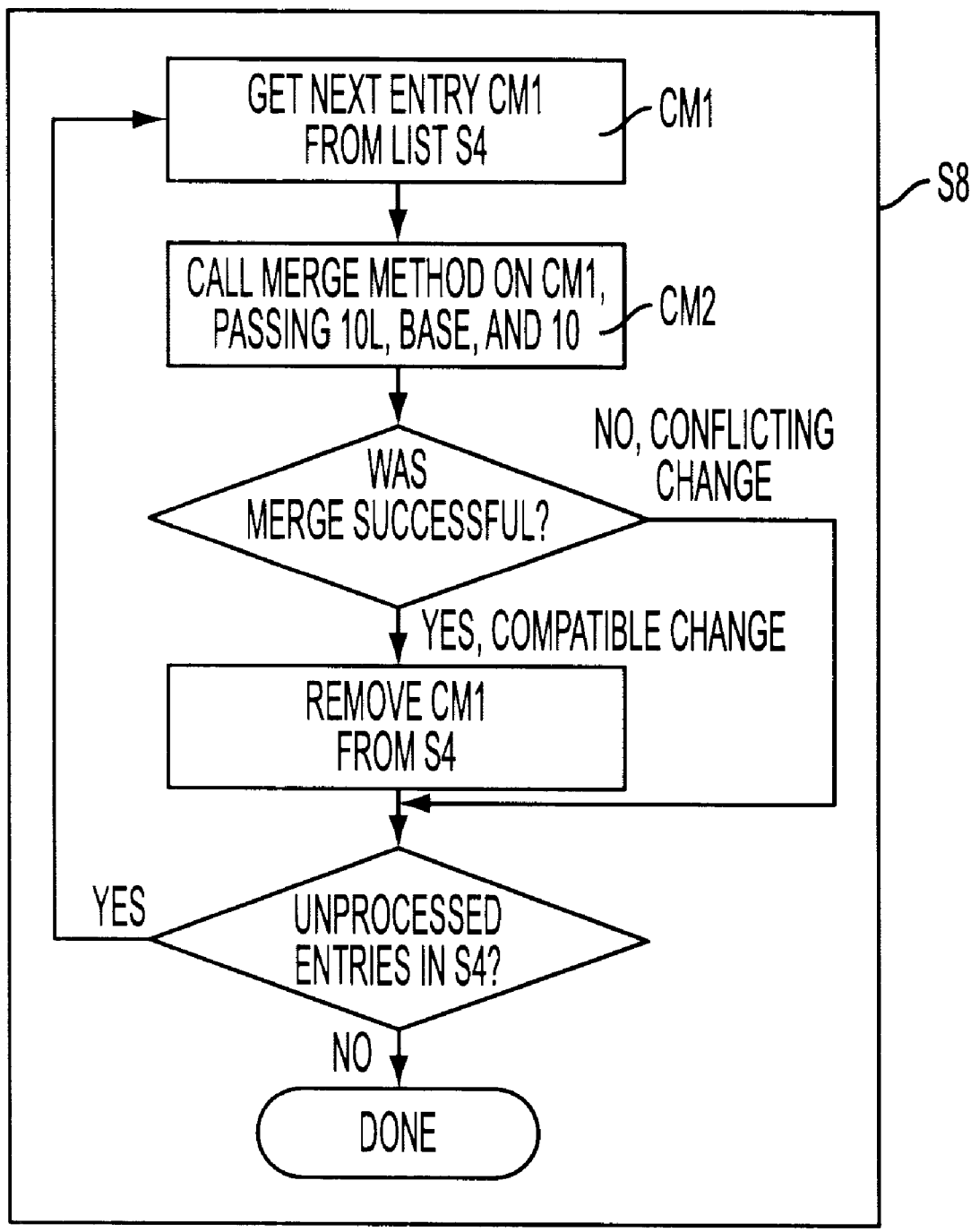
FIG. 17 is a flowchart of a Change Merging process.

FIG. 17 is a self-explanatory flowchart of one example of a Change Merging process. In this process, a merge method CM2 is called on a component CM1 whenever changes have been made to the component CM1 both in the local briefcase 5 and in a different briefcase 5 that has already been committed to the ProjectBank CDB 2. The change merge method CM2 is passed copies of the component CM1 in three different states: the original as-of state 45 when the component CM1 was put into the briefcase 5, the state of the component 10 as it exists in the ProjectBank CDB 2, and the state of the component 10L as it exists in the briefcase 5 before synchronization (FIG. 16). The merge method CM2 can then determine whether the changes are compatible, in which case a new "merged" state of the component CM1 is returned, or the method returns an indication that the changes are in conflict, in which case CM1 is not removed from the list S4. For example, if the change made in the current session was to the geometric location of the component CM1, and the change made in the other session was to the color of the component, the merge method CM2 can safely apply both sets of changes and return a new representation of the component at the new location with the new color. On the other hand, if the location of the component was changed in both sessions, the conflict cannot be resolved.

Figure 18:
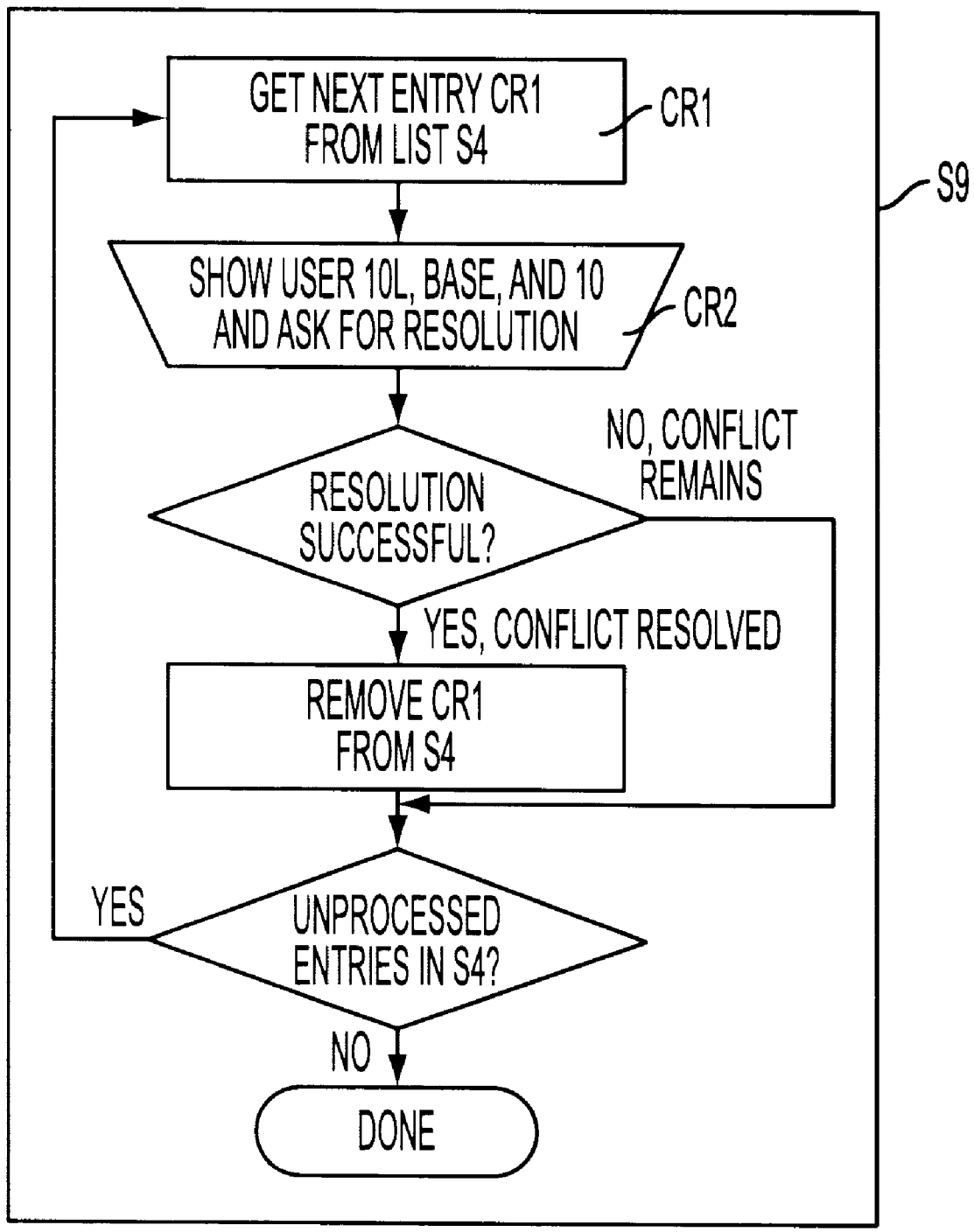
FIG. 18 is a flowchart of a Conflict Resolution process.

FIG. 18 is a self-explanatory flowchart of one example of a Conflict Resolution process. Before any component 10L can be committed to the server, all conflicts on list S4 within its domain-of-reference (step S1 of FIG. 16) must be resolved according to the procedure in FIG. 18. Generally, the two users involved in the conflicts on the list S4 must discuss them, and the user on the second computer 20 must resolve the conflicts. Preferably an interactive procedure (step CR2 of FIG. 18) is executed to present all possible relevant facts to the user on the second computer 20. As a result of the interactive procedure CR2, the user on the second computer 20 either accepts the user on the first computer's 20 change, asserts his own changes instead, or adapts his changes to accommodate the first user's changes.

Preferably, the ProjectBank Client program 4 shows or highlights conflicts in a manner that helps illustrate the intent of the changes locally and those already committed to the ProjectBank CDB 2 (step CR2 of FIG. 18). This process can be accomplished by overlaying several views of the conflicting components CR1 "in context" with other non-conflicting relevant components 10L. For example, one approach is to show in different colors and with control over the display for both the server version 10 and the local version 10L of: the "pre-changed" and "post-changed" versions of changed components 10, the set of components 10 that were deleted, and the set of components 10 that were added. By combining this information in the same view, the user can determine exactly what happened in his briefcase 5 and what happened elsewhere by other users. The user can elect the proper conflict resolution for each component CR1 in conflict list S4. Other schemes for highlighting unresolvable conflicts are within the scope of the invention.

Conflicting changes to components 10 that cannot be perceived by the end user must be resolved automatically by the schema 18. For example, it is often necessary to keep redundant information in indexes such as a spatial "range tree." When components 10 of the range tree (which cannot be resolved by a user) are in conflict, the schema 18 must automatically resolve them. Likewise, changes to certain attributes of even stand-alone and/or displayable components 10 must also be resolved automatically by the schema 18, as the user and/or application often cannot know how to do this correctly.

WPAPPING SCHEMAS

Figure 19:
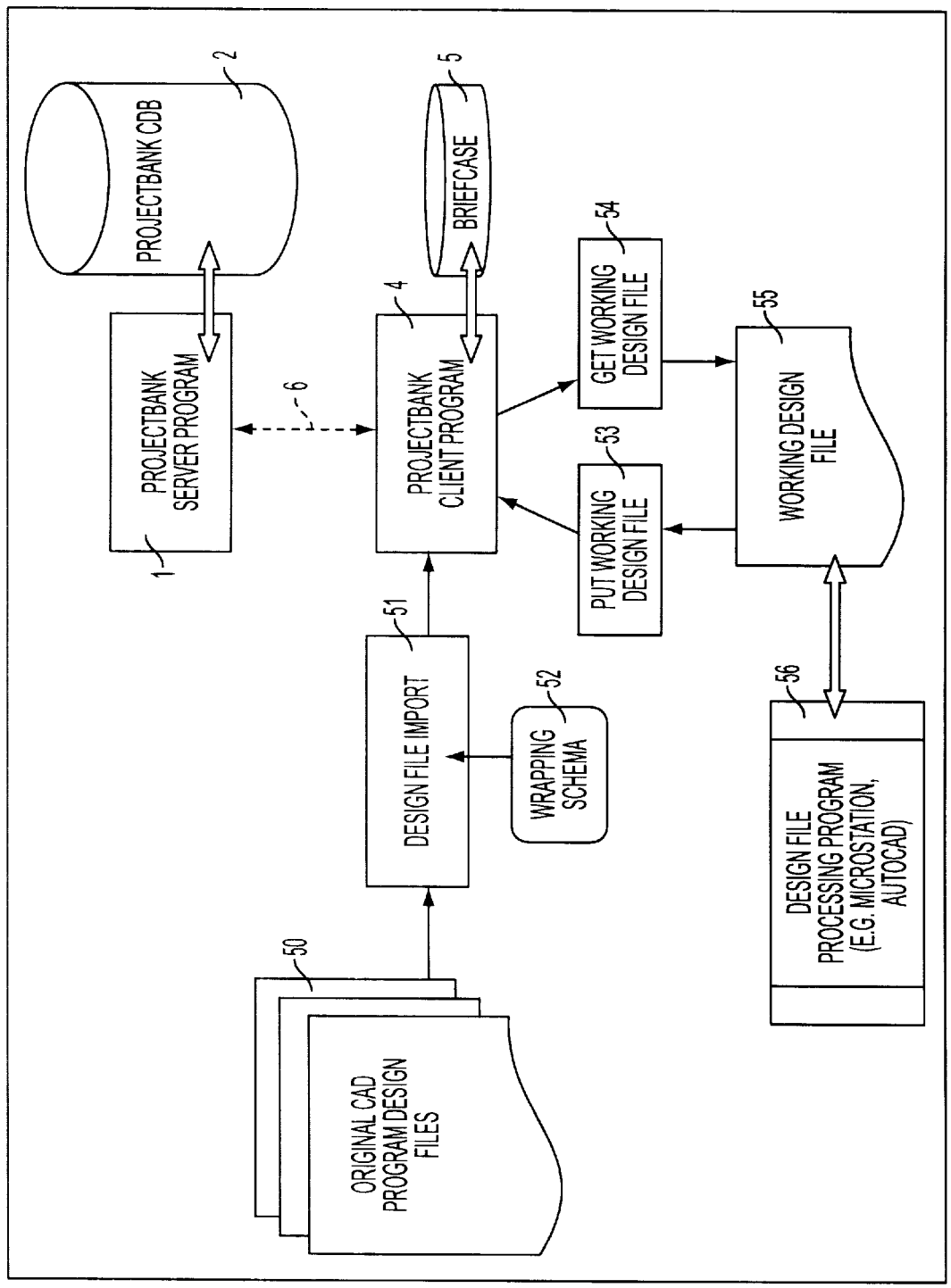
FIG. 19 shows the workflow for the files used in Project-Bank.
Figure 20:
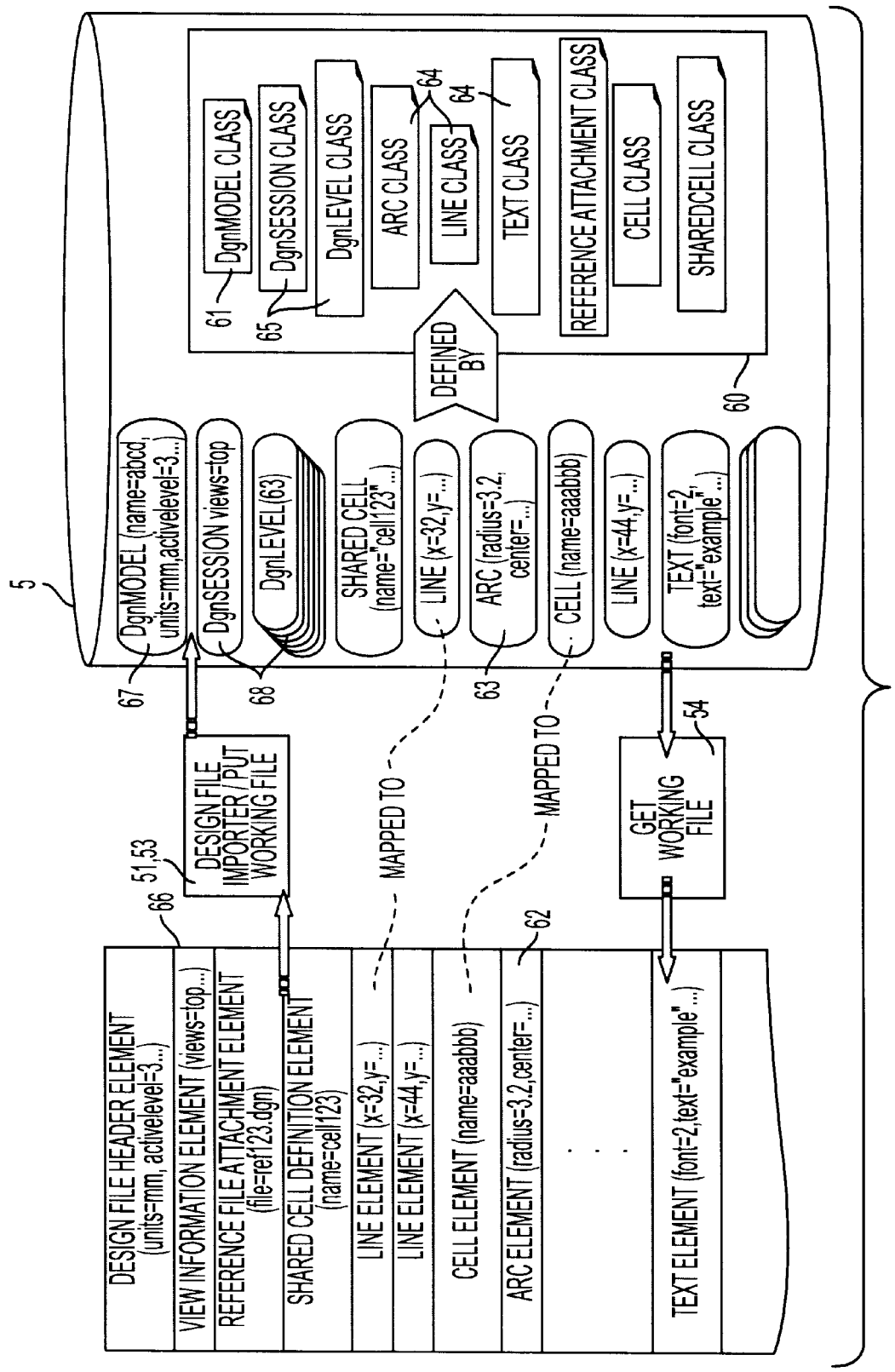
FIG. 20 shows a wrapping schema for a design file format.

FIG. 19 shows the workflow 57 for the files used in ProjectBank. FIG. 20 shows a self-explanatory example of a wrapping schema for a design file format.

As described above, the ProjectBank CDB 2 is the permanent repository for project information. Various component-oriented editing tools, such as described in U.S. Pat. No. 5,815,415 can be used to modify components 10L in a briefcase 5. However, to facilitate editing of project information with file-oriented Design File Processing tools 56, a temporary Working Design File 55 is created from a briefcase 5 by using a program 54 that converts components 10L to Design Files. The Working Design File 55 then reflects the current state of the project. The Working Design File 55 is read and modified by the Design File Processing program 56 exactly as if it had existed without ProjectBank. After one or more editing sessions, the Working Design File 55 is analyzed to determine what changes were made to it (block 53). These changes are "transferred" to the components 10L from which the Working Design File 55 was created. At that point, all of the ProjectBank facilities for change merging (FIG. 17), history archival (history chapter 40), and briefcase 5 management work as if the Working Design File 55 had never existed and the modifications had been made to the components 10L directly.

To facilitate the workflow 57 of FIG. 19, three additional user computer 20 programs are added:

(1) A Design File Importer program 51 to match a predefined Design File format 50 with a wrapping schema 52 to create an equivalent set of components 10L.

(2) A Get Working Design File program 54 to re-create an equivalent Working Design File 55 from the components 10L created by the Design File Importer program 51.

(3) A Put Working Design File program 53 that re-reads the temporary Working Design File 55 and determines changes to components 10L based on the differences between the modified Working Design File 55 and the original Working Design File 55 created by the Get Working Design File program 54.

Preferably, a CMS as described in U.S. Pat. No. 5,815,415 is used to allow the creation of flexible "schemas" 18 that contain classes 19 that define the contents and behaviors of components 10. If so, a special type of schema 18, called a wrapping schema 52, can be written to "wrap" a Design File format 50. Wrapping a file format means defining a set of classes 19 that capture exactly the information that can be stored in such a file, so that the contents of any file using that format can be represented as a collection of components 10 in the wrapping schema 52. For example, referring to FIG. 20, a DGN schema 60 would be written to wrap DGN files 66, defining a class 64 for each graphical element type, various classes 65 to capture non-graphical and setting data, and a class 61 to define a "DGN Model." It is not necessary to have a one-to-one mapping between elements 62 and the equivalent components 63 and the scope of the present invention includes schemes wherein plural elements are mapped to a single component, and schemes wherein plural components are mapped to a single element. Also, a wrapping schema 52 may be extended to support capabilities such as change merging (FIG. 17) and verifications that go beyond what are required just to capture the file format 50.

In a file-oriented system 56, only a file 50 has an identity, so only a file 50 can be moved, changed, and archived. In a ProjectBank CDB 2, each component 10 has an identity. It is therefore possible to retrieve, update, and document changes to project information at the component 10/element 62 level. Since the schema 52 exactly captures the information in a design file 50, an equivalent file 55 can always be obtained from its components 10.

FIG. 20 shows a wrapping schema for DGN file elements, which may alternatively be referred to as "file entities." However, the scope of the present invention includes schemes for wrapping other design file formats, including those using DWG elements and STEP elements. The example provided in FIG. 20 and the present specification is sufficiently detailed so that an artisan would understand how to wrap other design file formats.

IMPORTING DESIGN FILES

Figure 21:
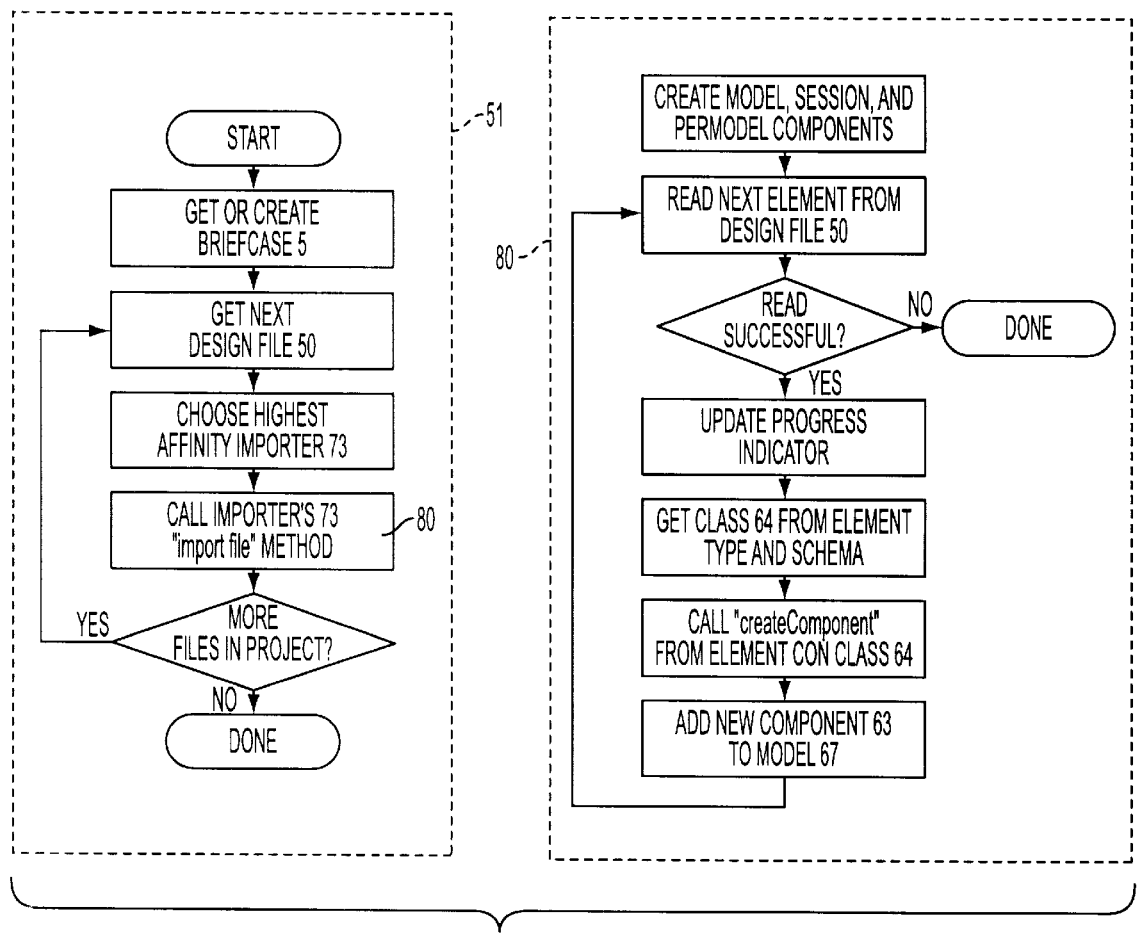
FIG. 21 is a flowchart of the design file import process.
Figure 22:
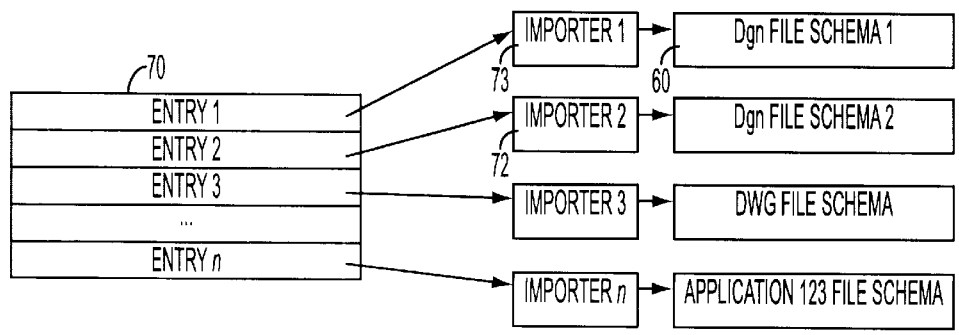
FIG. 22 provides an additional explanation of the file element import process.

FIG. 21 is a flowchart of the design file import process. FIG. 22 provides an additional explanation of the file element import process. FIG. 23 shows an example of the software code used for DGN schema element mapping.

The first step in the workflow process 57 of using ProjectBank CDB 2 to manage Design Files is to place an existing project 50 under ProjectBank control via the Design File import process 51. The process 51 is preferably a part of an administration module that is executed only by a "system administrator" or other authorized personnel one time when a project is first placed under ProjectBank control.

For each Design File 50 in the project, the first step in the import process 51 is to determine which one of a plurality of importers 73 should be used to import the file 50. The determination can be based either on an examination of the contents of the Design File 50, or on an empirical analysis of the file name, or a combination thereof. For example, the DGN File Importer 73 could base its affinity value on files with the extension ".DGN", and also examine the first two bytes of the file for the known values 0x0908 for a 2D Design File or 0x09c8 for a 3D Design file. A more specialized DGN File importer 72 that only works on DGN files created by a particular MicroStation-based application could look for the existence of an application element (e.g., a type 66 level 20 element). That importer 72 would only return a non-zero affinity for files that pass both the general DGN affinity test and the application-element-existence test.

Preferably, a list of "Possible Importers" 70 should be kept by the administration module and each possible importer 73 returns an "affinity value" for a particular Design File 50 to be imported. The Possible Importer 73 from the list 70 that returns highest affinity value is selected as the importer to use.

The job of the importer 73 is to translate the contents of the Design File 50 from its native format into a plurality of components 10L that completely represents everything in the original Design File 50. For each "original element" 62 in the imported Design File 66, an "equivalent component" 63 is created. In addition, there can be a component 67 that represents the file itself, plus components 68 that represent additional "settings" and/or other "overhead" elements that save other aspects of the Design File 66. It is not necessary that the equivalent components 63, 67, 68 represent the data in the original elements 62 byte-for-byte. It is only necessary that the class 61, 64, 65 that defines the equivalent components 63, 67, 68 be able to exactly reproduce the original element 62 byte-for-byte from its internal state 63, 67, 68 at any time. In this manner, it is possible to achieve a higher-level of semantic intelligence and interoperability between the equivalent components 63, 67, 68 and other ProjectBank components 10 from other schemas 18 without losing the ability to use existing Design File Processing tools 56 on the data.

After the import process 51 determines which importer 73 is to be used for a given Design File 50, the importer's 73 "importFile" method 80 is called to create the equivalent components 63, 67, 68 for the Design File 50. The importFile method 80 begins by creating all of the "fixed" components (e.g., 67, 68) (that is, the components which exist for every Design File 50 imported by the importer 73). The importer 73 then reads each element 62 in the Design File 50. For each element 62, the importer 73 determines, based on the type of element 62 and its associated schema 60, the appropriate class 64 to be used to create an equivalent component 63. The importer 73 then calls the "createComponent" method on that class 64, passing to it the element 62 under consideration.

Obviously, the "createcomponent" method for a class 64 will vary depending on the type of element 62 to be represented. For example, referring to FIG. 23, the DGN Line element type 90 could be mapped using a class such as 91 that contains fields to represent each of the points in the DON Line Element 90, plus the "header" information 92 that is common to all DGN elements. As one skilled in the art will understand, this equivalent mapping, while not identical byte-for-byte, contains all of the information necessary to re-create an equivalent DGN Line element 90 at any time. It should be equally obvious that this same mapping technique can be employed for each element type in a predefined Design File Format 50.

As described in more detail below in the Get Working Design File 54 and Put Working Design File 53 processes, it is essential that there be a unique identifier associated with each equivalent element 100 written to the Working Design File 55. However, some Design File types 50 (e.g., the DGN format) do not require a unique identifier for each element 62 in the Design File 50. In this case, the importer 73 should assign an identifier for each element (an Element Identifier 101), and the Element Identifier 101 should be saved within the component's 63 persistent data. In the case of the DGN File Format, the optional Association Tag field 93 can be used for this purpose. For all elements that do not already have an Association Tag value, the importer 73 should assign a new unique value and save it in the m_oAssocTag field 93. For a given component 10 in a ProjectBank CDB 2, its Element Identifier must be constant for its lifetime. The Element Identifier 101 can simply be the component tag 11 as assigned by the ProjectBank transaction mechanism. However, any unique-within-the-Design-File identifier can be used. For file formats that maintain unique identifiers, such as the DWG format, this step is not necessary.

The process 51 is repeated for each Design File 50 in the project. Sometimes, an element 62 in a Design File 50 will refer to another Design File 50 in the project. Consider, for example, the Reference File Attachment element (type 66, level 5) in the DGN format or the XREF entity in the DWG format. For these elements 62, a direct forward reference to the ProjectBank component 67 that represents the target Design File is saved in the data for the Reference Attachment or XREF component 63.

GET WORKING DESIGN FILE

Figure 24:
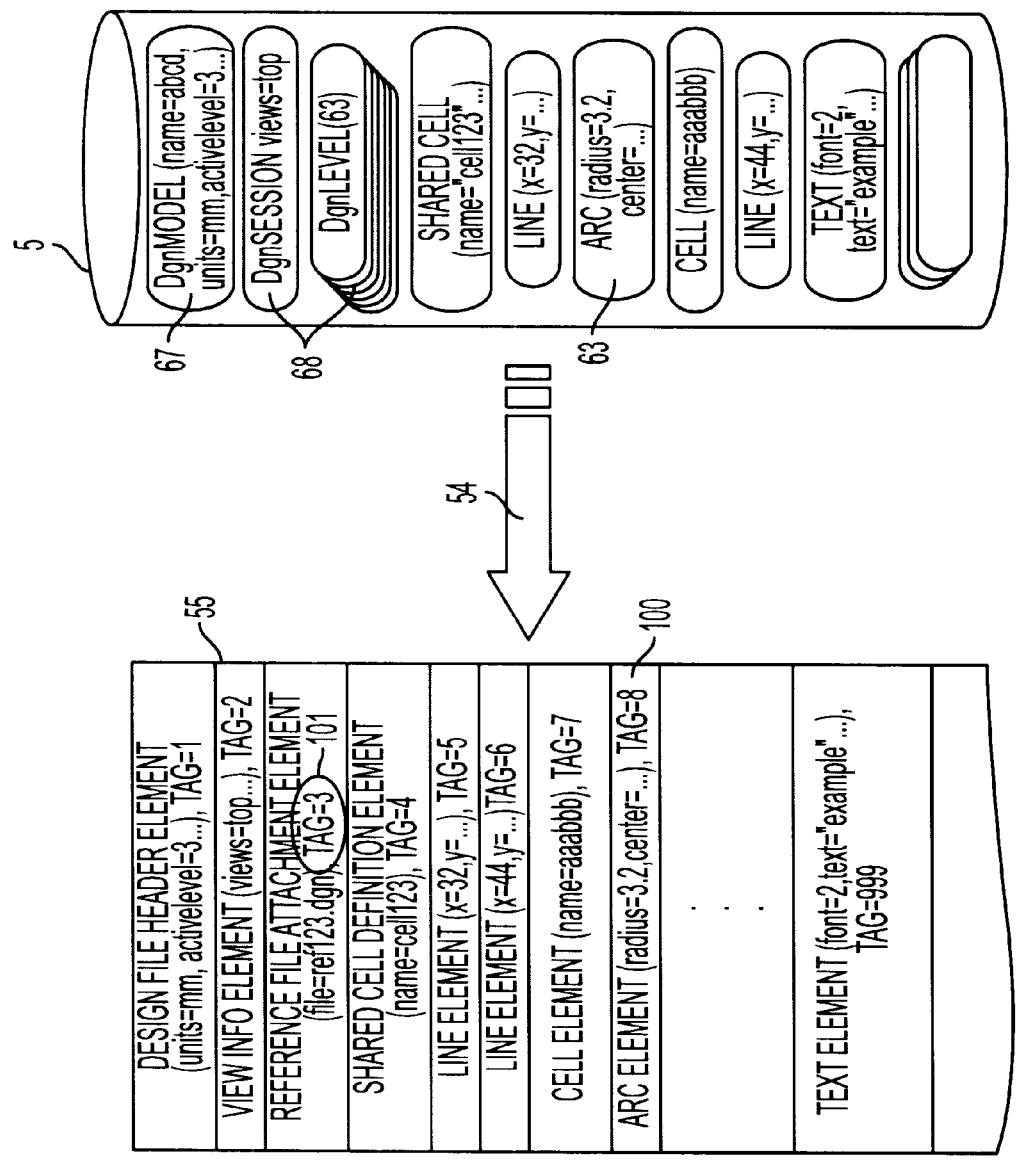
FIG. 24 shows the process of creating a working design file.

FIG. 24 shows the process of creating a working design file. To view or modify a Design File 50 that has been imported into a ProjectBank CDB 2, a process 54 to extract or "get" an equivalent working file is performed. The "Get Working Design File" process 54 is performed by a ProjectBank Client Program 4 against a briefcase 5. Since components 10L in a briefcase 5 can have an as-of date 32 corresponding to any chapter 40 in the project history file 3, this operation can create a working design file 55 at any historical date of the project.

The process 54 of creating a Working Design File 55 is functionally the inverse of the import process 51. That is, for each original element 62 in the imported file 50, an equivalent element 100 must be written to the Working Design File 55. The equivalent element 100 must be tagged somehow with its unique Element Identifier 101 so that the equivalent element 100 can later be rematched with the component 63 from which it was created. In the DGN Design File format, for example, this can be accomplished by using the optional Association ID field (see the MicroStation file format specification in the MicroStation programmers manual). As noted above, in the DWG format, the Entity Handle can function as the Element Identifier 101.

Some Design File formats, such as the DON format, require that each equivalent element 100 in the Working Design File 55 be written in the same order as original element 62 appeared in the imported file 50. In this case, it is necessary to save an "original sequence number" 94 in the data for each component 63. The components 63 are sorted by this value 94 before they are converted to equivalent elements 100 and written to the file 55.

Working Design Files 55 are created into a directory located in a relative path based on the file name of the briefcase 5. In this manner, a "Design File Processing Program" 56 (e.g., MicroStation or AutoCAD) can be directed to edit the Working Design File 55 without ambiguity. That is, there is no possibility of confusion due to the fact that multiple projects, or multiple briefcases 5 for the same project, may contain files 50 with the same original file name. Further, when equivalent Reference File Attachment elements 100 are created in Working Design Files 55, they are mapped to the same relative directory as the master Working Design File 55 and equivalent Working Reference Files 55 are extracted in the same step.

PUT WORKING DESIGN FILE

Figure 25:
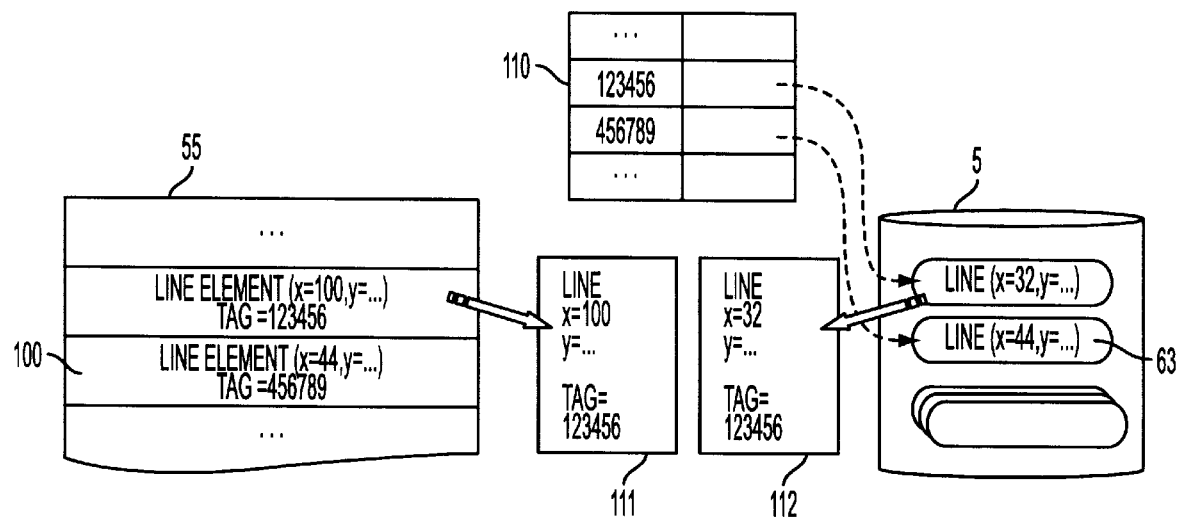
FIG. 25 illustrates how a working design file is analyzed to determine if any elements have been changed therein.

FIG. 25, along with the steps discussed below, illustrates how a working design file is analyzed to determine if any elements have been changed therein. After a Working Design File 55 has been edited by a Design File Processing Program 56, it potentially may have been changed by the Program 56. To commit any changes to the ProjectBank CDB 2, it is necessary to analyze the Working Design File 55 and "put" any changes made by the Design File Processing Program 56 back into the briefcase 5. The "Put Working Design File" process 53 can be initiated automatically whenever the Design File Processing Program 56 exits, or it can be deferred until it is manually requested by the user.

The following algorithm is used to determine whether any elements are changed in the Working Design File:
(1) Mark all equivalent components 63 with a known flag. Preferably, the components 63 are loaded into a CMS such as described in U.S. Pat. No. 5,815,415 wherein each component 10 has an "object descriptor" with a Mark Bit, which can be employed for this purpose. Also, create a lookup table 110 containing entries that map Element Identifiers 101 with equivalent components. Obviously, by using the component identifier as the element tag, this mapping step is a null transformation.
(2) For all elements 100 in the Working Design File, read the element 100 into a temporary element 111 and get the Element Identifier 101 written with it from the Get Working File process 54 above.
(3) Any element 100 from the Working Design File 55 that does not have an Element Identifier 101 on it was newly created by the Design File Processing Program 56. Therefore, create an equivalent component 63 for it and add that component 63 to the equivalent component 67 that represents the Design File.
(4) Find the equivalent component 63 from the Element Identifier 101 and the lookup table 110. Clear the Mark Flag, set in step (1), above on the equivalent component 63.
(5) Compare the equivalent component 63 with the temporary element 111, preferably by re-converting the equivalent component 63 to another temporary element 112 and comparing 111 and 112. Alternatively, the comparison can be made by converting the temporary element 111 into another temporary equivalent component calling an "isEqual" method on them.
(6) If the two temporary elements 111 and 112 are different, the equivalent component 63 has been modified by the Design File Processing Program 56. Update the data of the equivalent component 63 with the new values, keeping the same Element Identifier 101 and component tag 11.
(7) Check the flag, set in step (1) above, on all equivalent components 63. Any equivalent component 63 that still has its Mark Bit set was deleted by the Design File Processing Program 56. Therefore, delete it from the equivalent component 67 that represents the Design File.

Obviously, if no changes were made to the Working Design File 55 by the Design File Processing Program 56, the above algorithm will result in no changes to the briefcase 5.

SHADOW DIRECTORIES FOR DESIGN FILES

Figure 26:
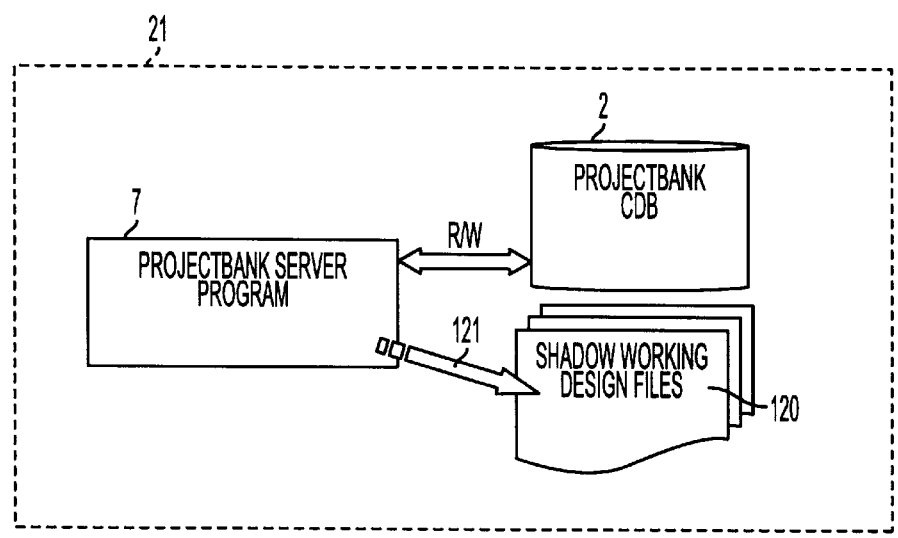
FIG. 26 illustrates a shadow directory for working design files.

FIG. 26 illustrates a shadow directory for working design files. Engineering design workflows often require project participants to view, but not change, large amounts of information created by other participants. This workflow is facilitated, for example, in the MicroStation program via Reference Files, and in the AutoCAD program via XREFs. Obviously, this workflow can be handled by the ProjectBank Server 1 and briefcase 5 structure without special treatment. However, the standard ProjectBank/briefcase structure would require that every participant download every reference Design File 50 into his briefcase 5 from which an equivalent Working Design File 55 is created.

In addition, established project procedures sometimes involve Design File Processing Programs 56 that expect to process the project directory tree of Design Files at one time. Obviously, this can also be handled by the standard ProjectBank/briefcase structure, but would require a briefcase 5 that holds a complete copy of the entire project.

For performance and disk-space reasons, it is sometimes desirable to maintain a Shadow Directory 120 of Working Design Files for all Design Files 50 in the project. This Shadow Directory 120 can exist on the same computer 21 as the ProjectBank Server Program 1, or can be on a different file server somewhere in the network. The Shadow Directory 120 is maintained by adding a module to the ProjectBank Server Program 1 to execute the Get Working File 54 command automatically every time any ProjectBank Client Program 4 does a commit.

If a Shadow Directory 120 exists on a file server in the network, the Get Working Design File operation 54 on a client computer 20 can be modified to direct the equivalent reference file attachment elements 100 created in the Working Design File 55 to "point to" the Shadow Directory 120. In addition, the step of creating equivalent Working Design Files 55 for the reference files can be omitted.

As discussed above, the synchronization/merging process, commit process and model storage process each occur entirely within the component realm. As also discussed above, the user typically does not directly edit components in his or her briefcase. Instead, the user edits the components via a file-oriented CAD tool. However, the scope of the present invention includes schemes wherein the user directly edits components in the briefcase. The main constraint for directly editing components is that users are unfamiliar with editing components. Thus, once users become familiar with components, the file-oriented editing interface can be eliminated, thereby eliminating the need for the translators and simplifying the overall process which can then be implemented entirely within the component realm.

The present invention may be implemented by any suitable combination of software and hardware. The software is implemented as a computer program product including at least one computer readable medium having computer logic recorded thereon to perform the functions discussed above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for synchronizing changes to a plurality of components stored in a central repository, the repository being accessible to plural users, each of whom are permitted to revise the components in the repository, the components representing file-based data of an engineering design file, the method comprising:

(a) a user creating a temporary design file at a local computer workstation by downloading the current data in the repository and converting the current data to create an original current version of the design file at the workstation;

(b) the user creating an edited version of the temporary design file from the original current version;

(c) the user requesting that the set of components which represent the edited version of the temporary design file be updated to reflect any component changes made in the repository since the creation of the original current version of the temporary design file by other users during the user's step (b) editing time period; and (d) during updating, locally detecting resolvable and unresolvable component conflicts on a per component basis between the components which represent the edited temporary version of the design file and the latest current version of the components.

2. A method according to claim 1 further comprising:

(e) allowing the components represented by the locally updated and edited temporary version of the design file to replace the latest current version of the components in the repository only if no unresolved component conflicts exist between the two versions.

3. A method according to claim 2 further comprising:

(f) archiving (i) the latest version of the individual components, and (ii) information to fully document any changes made to each version of each component.

4. A method according to claim 1 further comprising:

(e) highlighting to the user any unresolvable component conflicts.

5. A method according to claim 1 wherein resolvable component conflicts detected in step (d) include differences that relate to different components which are not affected by each other or different aspects of the same component which do not conflict with one another.

6. A method according to claim 1 wherein unresolvable component conflicts detected in step (d) include differences that relate to the same aspects of a component or that relate to components which affect each other in a conflicting manner.

7. An apparatus for synchronizing changes to a plurality of components stored in a central repository, the repository being accessible to plural users, each of whom are permitted to revise the components in the repository, the components representing file-based data of an engineering design file, the apparatus comprising:

(a) means for creating a temporary design file at a local computer workstation by downloading the current data in the repository and converting the current data to create an original current version of the design file at the workstation, the temporary design file being manipulated by a user;

(b) means for creating an edited version of the temporary design file from the original current version, the edited version being created by the user during an editing time period;

(c) means for requesting that the set of components which represent the edited version of the temporary design file be updated to reflect any component changes made in the repository since the creation of the original current version of the temporary design file by other users during the user's editing time period; and (d) means for locally detecting resolvable and unresolvable component conflicts on a per component basis between the components which represent the edited temporary version of the design file and the latest current version of the components during the updating.

8. An apparatus according to claim 7 further comprising:

(e) means for allowing the components represented by the locally updated and edited temporary version of the design file to replace the latest current version of the components in the repository only if no unresolved component conflicts exist between the two versions.

9. An apparatus according to claim 8 further comprising:

(f) means for archiving (i) the latest version of the individual components, and (ii) information to fully document any changes made to each version of each component.

10. An apparatus according to claim 7 further comprising:

(e) means for highlighting the unresolvable component conflicts.

11. An apparatus according to claim 7 wherein resolvable component conflicts detected by the means for locally detecting resolvable and unresolvable component conflicts include differences that relate to different components which are not affected by each other or different aspects of the same component which do not conflict with one another.

12. An apparatus according to claim 7 wherein unresolvable component conflicts detected by the means for locally detecting resolvable and unresolvable component conflicts include differences that relate to the same aspects of a component or that relate to components which affect each other in a conflicting manner.

* * * * *